(12) United States Patent
Murade et al.

(10) Patent No.: US 6,172,721 B1
(45) Date of Patent: Jan. 9, 2001

(54) ELECTROOPTICAL PANEL AND ELECTRONIC APPLIANCES

(75) Inventors: Masao Murade; Kenya Ishii, both of Suwa (JP)

(73) Assignee: Seiko Epson Corporation, Tokyo (JP)

(*) Notice: Under 35 U.S.C. 154(b), the term of this patent shall be extended for 0 days.

(21) Appl. No.: 09/245,287

(22) Filed: Feb. 5, 1999

(30) Foreign Application Priority Data

| Feb. 9, 1998 | (JP) | ................................................. | 10-027663 |
| Feb. 26, 1998 | (JP) | ................................................. | 10-046036 |
| Feb. 26, 1998 | (JP) | ................................................. | 10-046048 |

(51) Int. Cl.[7] .............................. G02F 1/136; H01L 21/44
(52) U.S. Cl. ................................ 349/43; 349/41; 438/670
(58) Field of Search ....................... 349/43, 41; 438/670, 438/30

(56) References Cited

U.S. PATENT DOCUMENTS

| 4,371,423 | * | 2/1983 | Yoshizawa et al. | ................. | 156/653 |
| 5,062,690 | * | 11/1991 | Whetten | ................. | 359/59 |
| 5,151,806 | * | 9/1992 | Kawamoto et al. | ................. | 359/59 |
| 5,223,454 | * | 6/1993 | Uda et al. | ................. | 437/189 |
| 5,763,899 | * | 6/1998 | Yamazaki et al. | ................. | 257/59 |
| 5,929,958 | * | 7/1999 | Ohta et al. | ................. | 349/141 |
| 5,995,178 | * | 11/1999 | Fujikawa et al. | ................. | 349/55 |
| 6,022,803 | * | 2/2000 | Takahashi | ................. | 438/670 |

FOREIGN PATENT DOCUMENTS 6-194502 * 7/1994 (JP) .

* cited by examiner

Primary Examiner—Kenneth Parker
Assistant Examiner—Mike Qi
(74) Attorney, Agent, or Firm—Oliff & Berridge, PLC

(57) ABSTRACT

The present invention provides an electrooptical panel and electronic appliances provided with the electrooptical panel, wherein production yield and a pixel aperture ratio are not decreased even when pixels are made fine in the electrooptical panel using an active matrix addressing method by TFT addressing.

The foregoing problems can be solved by putting a plurality of communication lines into electrical contact with the TFT array substrate via contact holes, wherein a plurality of pixel electrodes addressed using a TFT by the data line and scanning line are provided. A lift-up film is formed under the contact holes formed through an interlayer insulation film to put the drain region of the TFT in electrical contact with the pixel electrode.

27 Claims, 18 Drawing Sheets

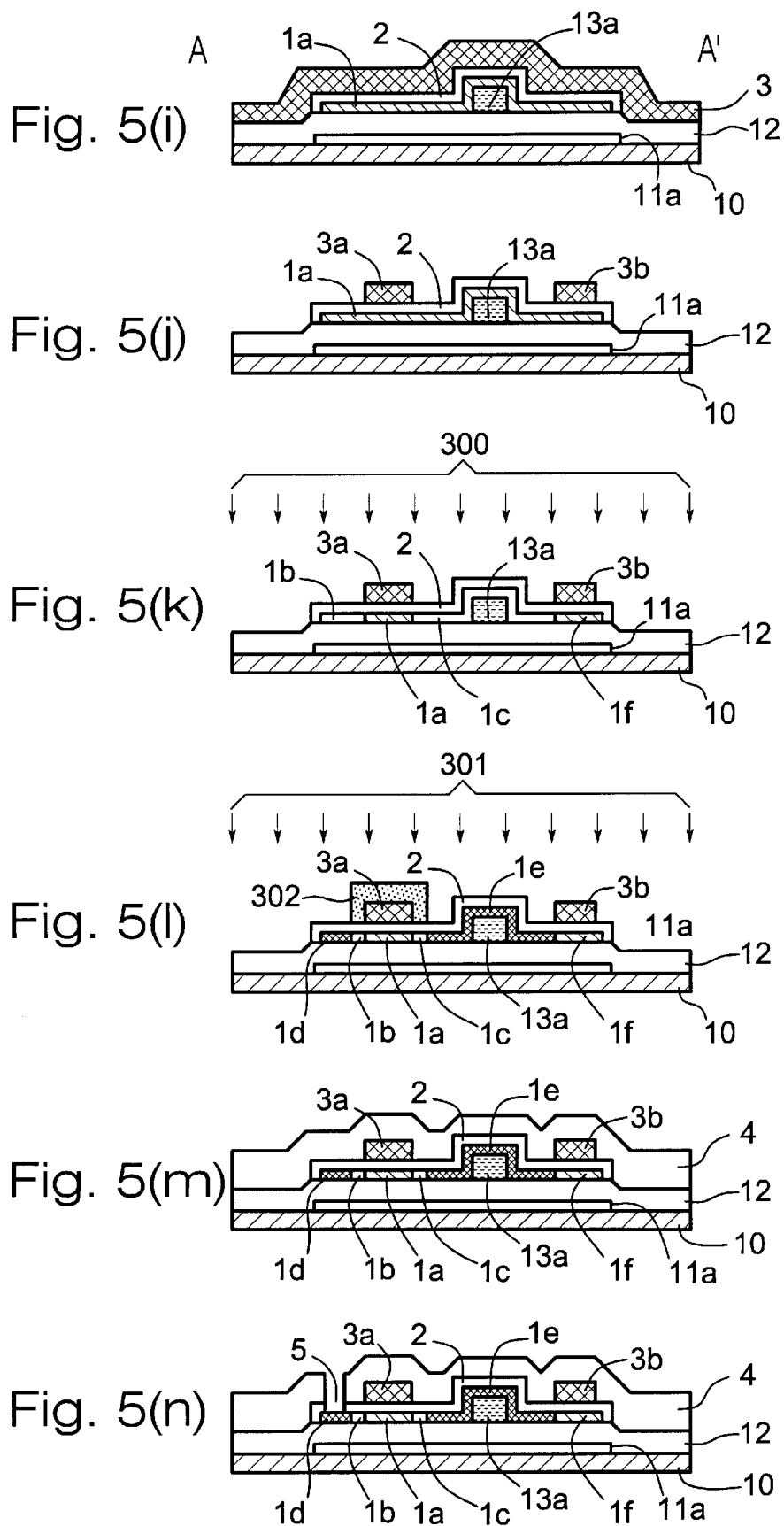

ELECTROOPTICAL PANEL AND ELECTRONIC APPLIANCES

BACKGROUND OF THE INVENTION

1. Field of Invention

The present invention relates to an active matrix electrooptical panel such as a liquid crystal panel having a thin film transistor (referred to TFT hereinafter) addressing-type panel, and to electronic appliances using the electrooptical panel.

2. Description of Related Art

FIG. 16 shows an active matrix liquid crystal panel having a plurality of pixel electrodes 9a provided in a matrix and a TFT switching element 30' for each pixel electrode. Scanning lines 3a and data lines 6a cross near each of the TFTs 30' and the pixel electrodes 9a are in electrical contact with a drain region of the TFTs 30' via contact holes 8 in a TFT array substrate. Each TFT 30' is constructed so that a channel region 1a' (the area indicated by hatch lines from the bottom to the left-top in FIG. 16) of a semiconductor layer 1a is controlled by a gate electrode 3a' extending from the scanning line 3a. The data line 6a, which supplies image signals, is put into electrical contact with the source region of the semiconductor layer 1a via a contact hole 5. Since the pixel electrode 9a can be provided on various films including wiring connections for the TFT 30', data lines 6a and scanning lines 3a, or on the interlayer insulation films for insulating the pixel electrodes 9a, the pixel electrode 9a is put into electrical contact with the drain region of TFT 30' via the contact hole 8 formed in an interlayer insulation film.

To obtain a high resolution liquid crystal panel, pixels in the display must be made smaller (i.e., finer) and very precisely. However, narrowing the pixel pitch L as shown in FIG. 16 to enable fine and precise image display by increasing pixel density or to compact the liquid crystal panel causes spaces between wiring lines that serve as non-opening regions to be narrowed. One important factor typically required for a liquid crystal panel is, on the other hand, increasing the brightness of the panel. Increased brightness can be realized by increasing the aperture ratio of the pixel, i.e., increasing the ratio of the opening region of the pixel to the image display region of the pixel. However, the TFT region, which includes wiring lines and switching elements for a pixel, serves as a non-opening region and when the pixel is made to be fine, the TFT region limits the extent to which the aperture ratio of the pixels can be increased. Accordingly, making the pixels fine results in narrowing of the distance between the contact holes 8 for contacting the pixel electrodes 9a with the TFT 30', and data lines 6a or scanning lines 3a, possibly causing fatal defects by forming short-circuits between the pixel electrodes 9a and respective wiring lines.

SUMMARY OF THE INVENTION

When increasing the aperture ratio of a pixel, it is important that, not only the wiring width of the data lines 6a and scanning lines 3a is narrowed, but also the TFT 30' as a switching element is made fine. For that purpose, the size of the contact hole 5 between the source region of the semiconductor layer 1a and data line 6a, and the size of the contact hole 8 between the drain region and pixel electrode 9a of the semiconductor layer 1a should be made fine. FIG. 17 shows a cross-section of the TFT 30' along the line D–D' in FIG. 16, indicating a process for opening the contact hole 8. As shown in FIG. 17(a), a gate insulation film 2, interlayer insulation films 4 and 7 and a resist 302 are formed over the semiconductor layer 1a. As shown in FIG. 17(b), a portion of the resist 302 is irradiated with light (to remove the resist 302 in the case of the positive-type resist) by exposing the resist 302 from the photomask side 303 through a hole in a chromium film 304 over the drain region 1e of the semiconductor layer 1a. However, the step between the interlayer insulation films 4 and 7 caused by the gate electrode 3a' causes a difficulty. When the contact hole 8 is formed in close vicinity to the gate electrode 3a' to make the size of TFT 30' minute, light is irregularly reflected by the step, causing a problem that the resist is exposed to light in the directions shown by the opposed arrows in FIG. 17(b). This leaves a pattern of the removed resist 302, or an opening for the contact hole, with a larger diameter than the hole in the light-shielding chromium film 304 on the photomask 303. When this removed resist pattern is etched as shown in FIG. 17(c), the diameter of the opening is larger than the pattern diameter for the contact hole formed on the photomask 303, causing a difficulty for making the contact hole 8 fine.

A high quality display image and low power consumption are frequently required in liquid crystal panels. Thus, micro-lenses may be used for enhancing the efficiency of light incident on the liquid crystal panels. In the conventional art shown in FIG. 16, the incident light is partially blocked by the light-shielding film 22 provided on the opposing substrate so that the light passes inside the dashed lines. If the region where the light passes is not in line symmetry relation to the center of the pixel aperture, it is impossible to effectively use the light passing through the micro-lens at a maximum degree, and sufficiently obtain the efficiency of the incident light.

The invention provides an electrooptical panel and electronic appliances that include the electrooptical panel that avoid decreases in process yield and pixel aperture ratio even when pixels are made fine.

The invention provides an electrooptical panel having a plurality of data lines and scanning lines intersecting with the data lines, thin film transistors connected to corresponding data lines and pixel electrodes electrically connected to a corresponding thin film transistor. The thin film transistors each have a semiconductor layer separated from a gate electrode by a gate insulation film. At least one interlayer insulation film is formed over the semiconductor layer and gate electrode, and the drain regions of the thin film transistors are electronically connected to the pixel electrodes via contact holes formed through the interlayer insulation film. The contact holes are disposed in close proximity to at least one of the scanning lines and data lines, and a lift-up film is formed under the contact holes.

In one aspect of the invention, the lift-up film is formed under the contact hole so as to reduce the step height between at least one of the scanning lines and data lines and flattening the surface of the interlayer insulation. Therefore, preventing disclination of the liquid crystal due to step formation is possible. While a resist mask can be formed on the interlayer insulation film for allowing a desired region of the interlayer insulation film to be removed, reflection of light on the film surface can be suppressed to prevent retreat of the resist when the resist mask is exposed during a photolithographic process. Thus, the contact holes are formed with approximately the same size as that of the pattern on the mask. Accordingly, the dimension of the opening for the contact hole is not enlarged thereby increasing production yield with respect to pixel defects. Making the dimension of the contact holes accurately also allows the pixels to be made fine, thus providing a fine, precise and compact electrooptical panel.

In one aspect of the invention, at least one of the scanning line and data line, and the lift-up film have approximately the same film thickness.

The invention also provides an electrooptical panel having a plurality of data lines and scanning lines intersecting with the data lines, thin film transistors connected to corresponding data lines and pixel electrodes electrically connected to a corresponding thin film transistor. The thin film transistors each have a semiconductor layer separated from a gate electrode by a gate insulation film. At least one interlayer insulation film is formed over the semiconductor layer and gate electrode, and the drain regions of the thin film transistors are electrically connected to the pixel electrodes via contact holes formed through the interlayer insulation film. A capacitor line serves as one electrode of a capacitor and is aligned approximately parallel with the scanning lines. The contact holes are disposed between each scanning line and each capacitor line, and a lift-up film is formed under each contact hole.

In one aspect of the invention, the contact holes are provided between the scanning lines and capacitor lines and the lift-up film is formed under the contact hole making it possible to reduce the step height between the scanning line and capacitor line, thereby flattening the surface of the interlayer insulation film. Forming the contact hole between the scanning line and capacitor line allows the contact hole to be provided in the region where light is shielded by fitting the scanning line and capacitor line in the same region as the disclination region formed by the transverse electric field generated between the two adjoining pixel electrodes in the conventional art. Accordingly, disclination of the liquid crystal can be prevented along with suppressing the dimension of the opening of the contact hole from being broadened when the resist mask is exposed in the photolithographic process.

In one aspect of the invention, the scanning lines and capacitor lines are simultaneously formed using the same material, the gate insulation film and the dielectric film of the capacitor are simultaneously formed using the same material, and the semiconductor layer and the other electrode of the capacitor are simultaneously formed using the same material.

In one aspect of the invention, the scanning line and the capacitor line are nearly leveled with each other to reduce the step height between them. Since the lift-up film can be tailored to match to this step height, the step height between the scanning line, capacitor line and contact hole can be easily adjusted along with leveling their upper surfaces with respect to each other, thus making the contact holes fine and decreasing disclination.

In one aspect of the invention, at least a part of the lift-up film is formed so as to surround the contact hole, and at least one of the scanning lines is formed to be hollow along the lift-up film.

In one aspect of the invention, at least a part of the lift-up film is formed along the contact hole forming region and at least one of the scanning line and capacitor line is aligned along the lift-up film. Therefore, the aperture ratio is not decreased for the pixels even when the scanning line is disposed in close proximity to the capacitor line, thereby enabling the formation of a contact hole with a large opening area between the scanning line and capacitor line.

In one aspect of the invention, the lift-up film is formed so that the film does not overlap with the scanning lines and capacitor lines.

Accordingly, a step owing to overlap of the scanning line or capacitor line and the lift-up film is not generated so that their upper surfaces are more level with respect to each other, thereby further preventing disclination of the liquid crystal from being formed by the step or broadening the opening of the contact hole.

In one aspect of the invention, the lift-up film has the same film thickness as at least one of the scanning line and capacitor line.

In one aspect of the invention, adjusting the film thickness of the lift-up film to be approximately equal to that of at least the scanning line and capacitor line allows the step height between the lift-up film, and at least one of the scanning line and capacitor line, to be smaller.

In one aspect of the invention, the lift-up film is a conductive film in electrical contact with the drain region.

Accordingly, the lift-up film serves as an etching stopper in forming the contact hole provided that the lift-up film is formed on the drain region. On the other hand, when the lift-up film is formed under the drain region, pixel defects can be avoided even if the contact hole has penetrated through the drain region since the lift-up film is in electrical contact with the conductive film.

In one aspect of the invention, the lift-up film is a conductive film simultaneously formed on the drain region using the same material as used in the data line.

In one aspect of the invention, the lift-up film can be formed without increasing the processing steps since the lift-up film is simultaneously formed on the drain region using the same material as used in the data line.

In one aspect of the invention, the lift-up film is a conductive film formed under the drain region.

In one aspect of the invention, pixel defects can be avoided even if the contact hole has penetrated through the drain region since the lift-up film is in electrical contact with the conductive film. Accordingly, the semiconductor layer can be made thin to enable a high speed writing, thus providing an electrooptical panel with a high contrast ratio.

The invention also provides electronic appliances provided with an electrooptical panel.

In one aspect of the invention, a bright and high quality image display is made possible by using an electrooptical panel having a wide irradiation area to the opening region by which the luminous energy efficiency is improved.

In one aspect of the invention, the invention provides an electrooptical panel comprising a plurality of data lines, a plurality of scanning lines crossing with the plurality of data lines, a switching element connected to each data line and scanning line, and a plurality of pixel electrodes disposed in a matrix while being connected to the plurality of switching elements on the first substrate, the pixel electrodes being connected to a switching element via a contact hole, the contact hole being allowed to open at nearly a center position between the data line for supplying image signals to the pixel electrode and the data line adjoining the foregoing data line. Accordingly, the contact hole being allowed to open on the interlayer insulation film for connecting the TFT drain region as a switching element to the pixel electrode is formed at a nearly center position between the data line for supplying image signals to the corresponding pixel electrode and the data line adjoining to the foregoing data line to prevent the data line and pixel electrode from forming a short circuit between them, thereby not causing any decrease in the production yield and pixel aperture ratio even if the pixels become minute.

In one aspect of the invention, capacitor lines for endowing the respective pixel electrodes with a prescribed capacitance are provided on the first substrate in parallel relation to the scanning lines, wherein the contact hole is allowed to open between the capacitor line and scanning line in adjoining relation with each other.

Accordingly, the TFT as a switching element and the contact hole for putting the pixel electrode in electrical continuity cause disclination of the liquid crystal due to step configuration between them. However, providing the contact hole between the scanning line and capacitor line makes it possible to fit the TFT into the region where disclination of the liquid crystal due to transverse electric field among the pixels is generated. The configuration described above allows non-opening regions, forced to be light-shielded to suppress generation of the liquid crystal disclination, to be adjusted to a minimum proportion. Providing the data lines for endowing the pixel electrode with capacitance in order to retain writing charges of the pixels in the disclination generating region allows to provide an electrooptical panel with a high image quality without decreasing the pixel aperture ratio. Since the contact hole is allowed to open by taking advantage of the space between the adjoining capacitor line and scanning line without sandwiching the contact hole between them, the opening region whose width along the data line direction is prescribed by the capacitor line and data line can be broadened within each pixel disposed in a matrix. Accordingly, the luminous energy efficiency is improved as compared with the case when the contact holes are formed at the corner of each pixel.

In one aspect of the invention, least a lift-up film is provided under the switching element and just under the contact hole. Accordingly, a lift-up film is placed under the semiconductor layer of the TFT at a prescribed position for allowing the contact hole, provided for connecting the TFT as a switching element to the pixel electrode, to open, so that pixel defects can be prevented from occurring even when the contact hole opened by the etching process has penetrated through the semiconductor layer. This configuration makes it possible to thin the semiconductor layer, providing an electrooptical panel having a high contrast ratio since a high speed writing characteristics can be obtained.

In one aspect of the invention, the switching element comprises a thin film transistor, the source region of the thin film transistor being in electrical continuity with a data line, the drain region of the thin film transistor being connected to the pixel electrode, and the lift-up film as a conductive film being in electrical continuity with the drain region. Accordingly, the lift-up film is put into electrical continuity with the drain region of the TFT semiconductor region as a switching element. The lift-up film is formed of a conductive film of a poly-silicon film, a high melting point metal film such as a W (tungsten), Ti (titanium), Cr (chromium), Mo (molybdenum) or Ta (tantalum) film, or an alloy film thereof. Therefore, any pixel defects are not caused even when the contact hole penetrates through the semiconductor layer in opening it by an etching process, because the lift-up film is put into electrical continuity.

In one aspect of the invention, the lift-up film is provided so that the film is not overlapped with the scanning line and capacitor line. Accordingly, the lift-up film provided under the TFT drain region of the TFT semiconductor layer is placed not to overlap with the scanning line and capacitor line provided on the semiconductor layer via the gate insulation film. This means that the surface of the interlayer insulation film on the drain region of the semiconductor layer can be approximately flattened. A resist mask is formed at the region where the interlayer insulation film is not removed for opening the contact hole at a prescribed region of the interlayer insulation film. However, when the surface of the interlayer insulation film is flattened in exposing the resist mask by the photolithographic process, reflection of light on the film surface can be suppressed to prevent the resist from being retreated, thereby making it possible to form the contact hole with the same dimension as that of the mask. Accordingly, no decrease of the production yield due to pixel defects is caused since the diameter of the opening of the contact hole is never broadened. Making the contact hole fine also allows the pixel to be fine, thus providing a highly precise and compact electrooptical panel.

In one aspect of the invention, the film thickness of the lift-up film is nearly equal to the film thickness of the scanning line and capacitor line. Accordingly, more flattening of the surface of the interlayer insulation film on the TFT drain region is made possible by adjusting the film thickness of the lift-up film to nearly equal to the film thickness of the capacitor line and scanning line, further preventing the resist mask from being retreated, making the dimension of the contact hole finer and enabling the pixel to be fine, which is advantageous for making the electrooptical panel precise, fine and compact.

In one aspect of the invention, the opening region has a plane configuration being in a line symmetry relation to the contact hole. Accordingly, the contact hole for putting the TFT drain region into electrical continuity to the pixel region is allowed to open at the position in line symmetry relation to the center line of the opening region. Therefore, the opening region with a line symmetry, disposed in a matrix and situated at near the center within the respective pixel having a square shape, can be broadened, wherein the steps of the pixel electrode around the contact hole are distributed in line symmetry relation to the opening region. Accordingly, possibility of orientation faults such as reverse tilt becomes almost equal even when a levorotatory liquid crystal or a dextrorotatory liquid crystal is used. In other word, the case when distinct orientation faults occur when either the levorotatory or the dextrorotatory liquid crystal is used can be obviated, being advantageous since either type of the liquid crystal can be equally used. Moreover, luminous energy efficiency can be improved as compared with the case when a circular light irradiation region having no line symmetry is formed in the opening region as a result of forming the contact holes at the corner of each pixel as in the conventional art shown in FIG. 16.

In one aspect of the invention, a micro-lens is provided at a position confronting each pixel electrode so that the center of the lens is situated at the center point of the opening region. Accordingly, since the center point of the circular light irradiation region by the micro-lens is focused on the center point of the opening region of the pixel, the proportion occupied by the light irradiation region to the opening region is increased to improve luminous energy efficiency, thereby enabling to provide a luminous electrooptical panel even when the pixels are made fine.

The foregoing and other objects, features and advantages of the present invention will be apparent from the following more particular description of a preferred embodiment of the invention as illustrated in the accompanying drawings.

BRIEF DESCRIPTION OF THE DRAWINGS

FIGS. 4–6 show steps (a–t) of a process for constructing the liquid crystal panel according to the embodiment shown in FIG. 3.

DETAILED DESCRIPTION OF PREFERRED EMBODIMENTS

Figure 1:
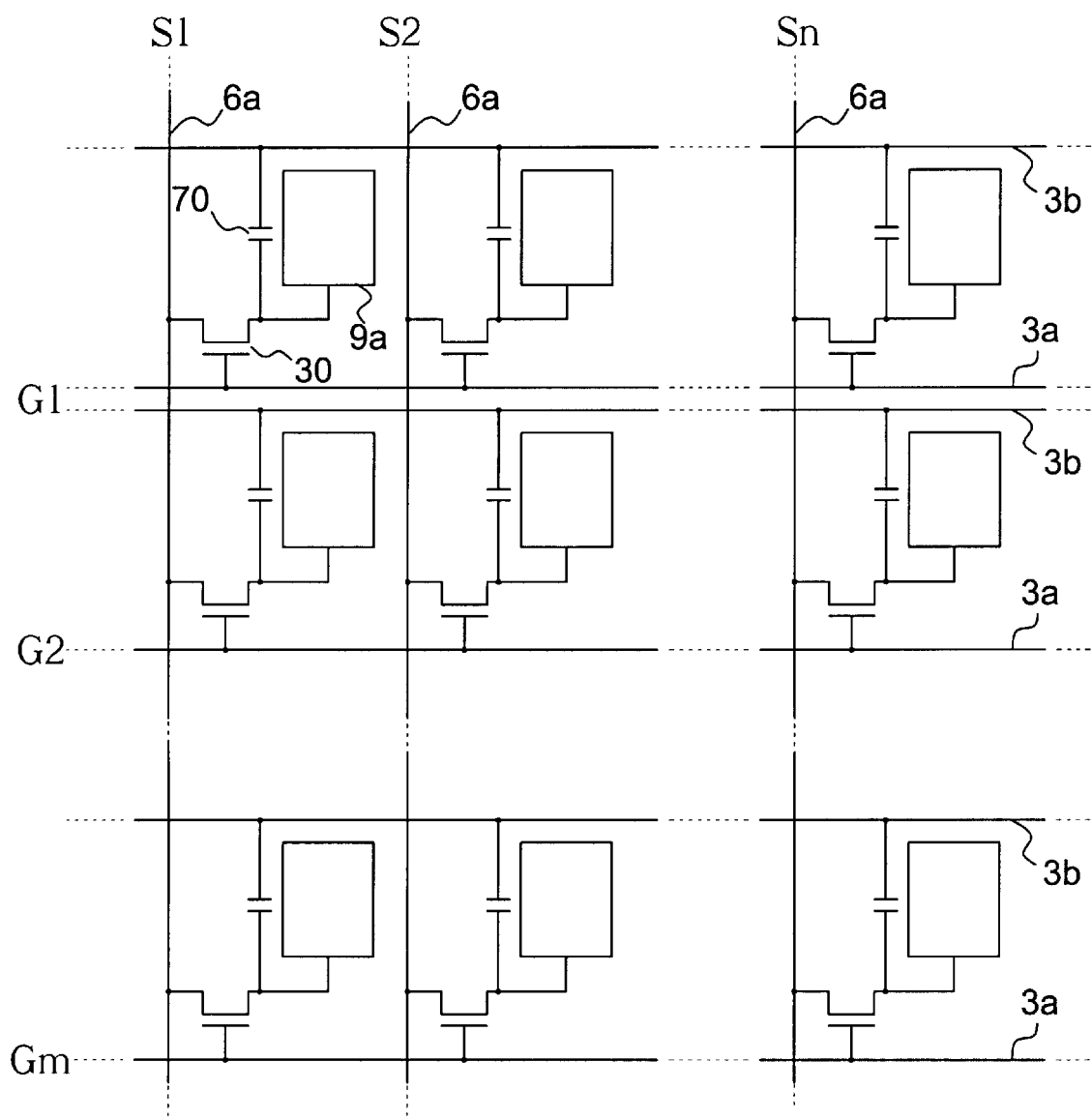
FIG. 1 shows a circuit diagram of pixels in an image display region of a liquid crystal panel.

The embodiments of the present invention will be described referring to the drawings. The embodiments are explained using a liquid crystal panel as a example of an electrooptical panel.

Figure 2:
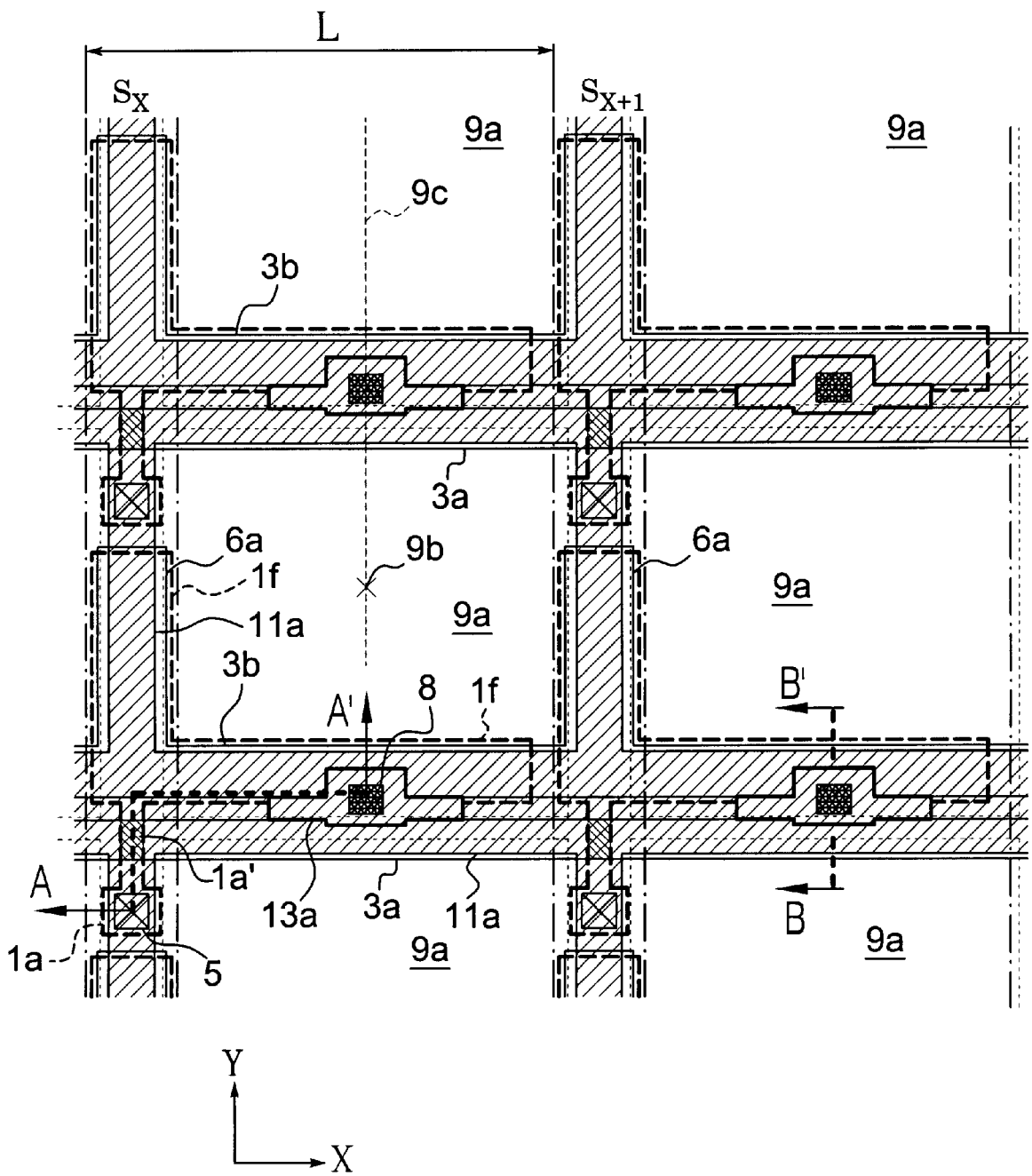
FIG. 2 shows a top plan view of a group of adjoining pixels on a TFT array substrate in a first embodiment of the liquid crystal panel of the invention.
Figure 3:
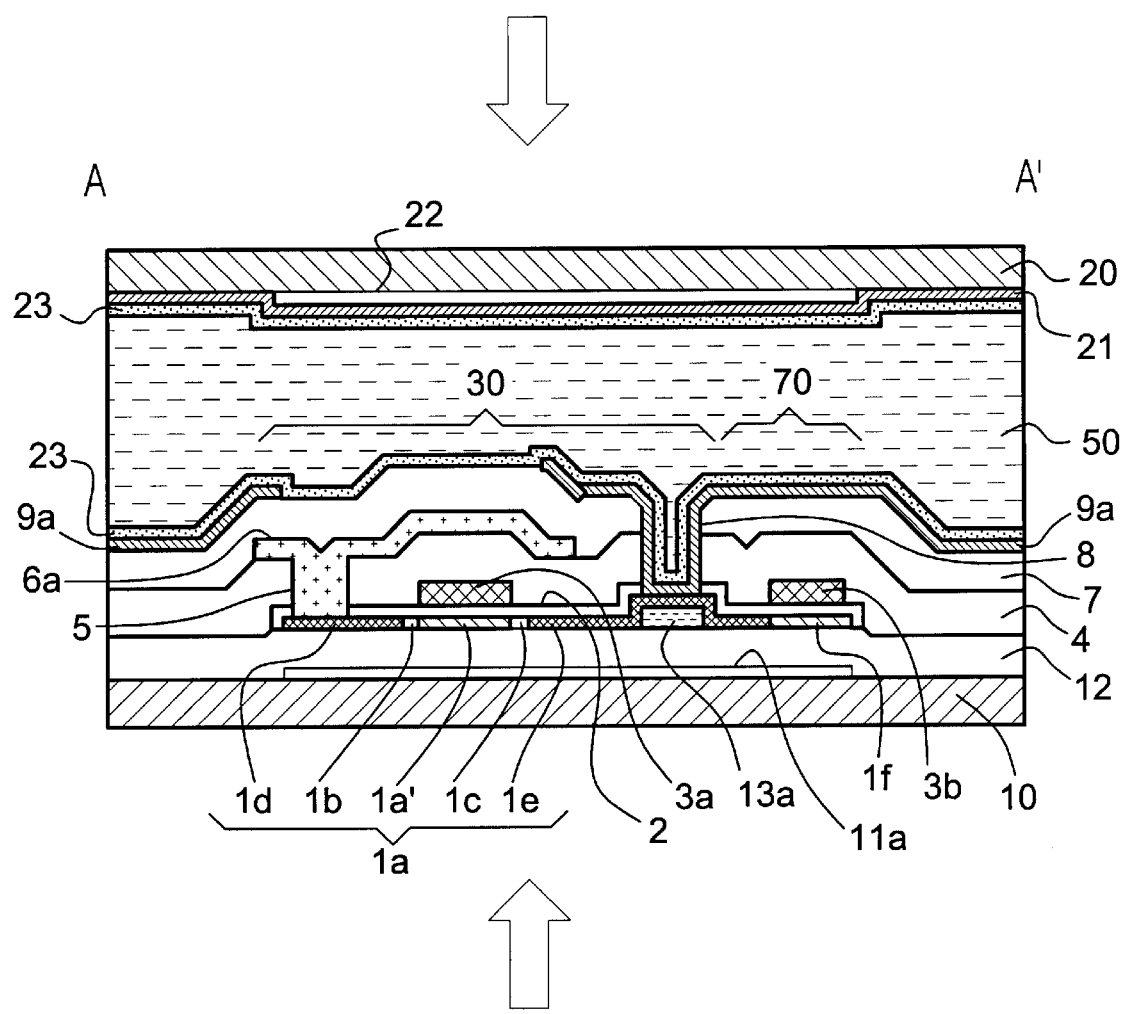
FIG. 3 shows a cross section along the line A–A' illustrated together with the opposing substrate.
Figure 4A:
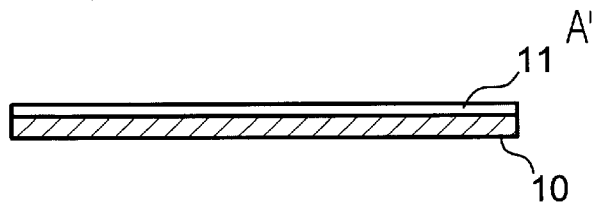
Figure 4B:
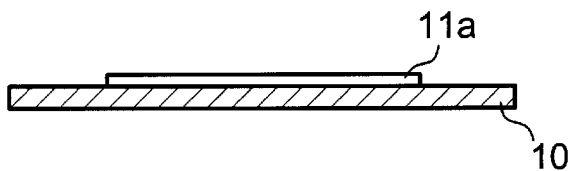
Figure 4C:
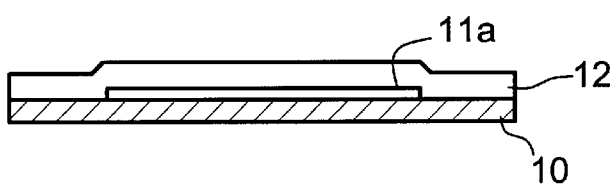
Figure 4D:
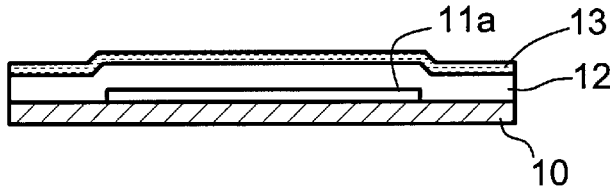
Figure 4E:
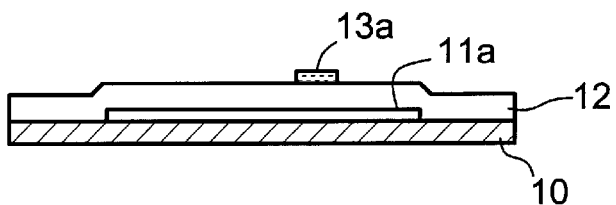
Figure 4F:
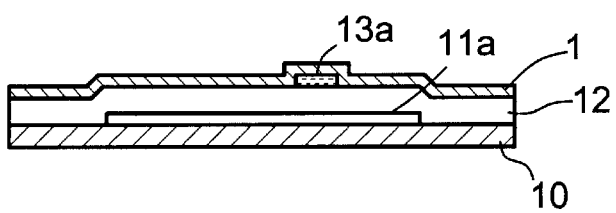
Figure 4G:
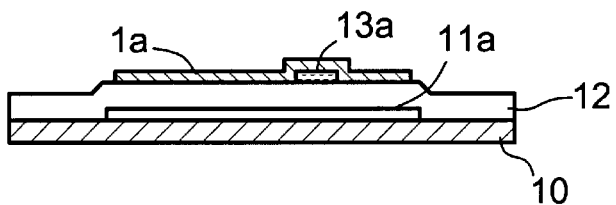
Figure 4H:
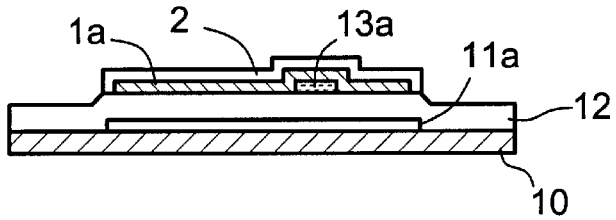
Figure 6O:
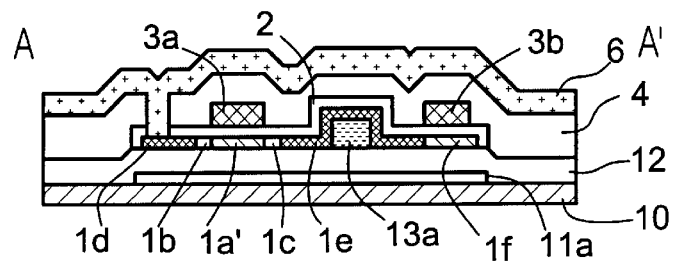
Figure 6P:
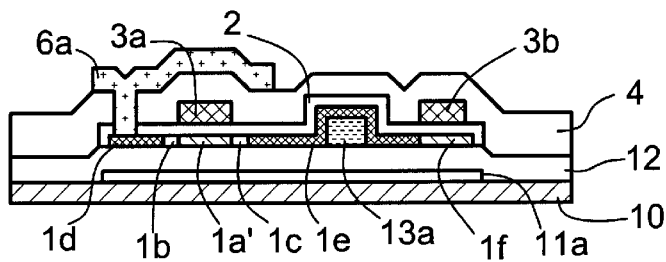
Figure 6Q:
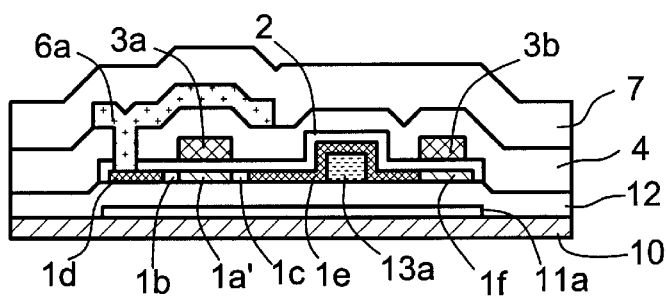
Figure 6R:
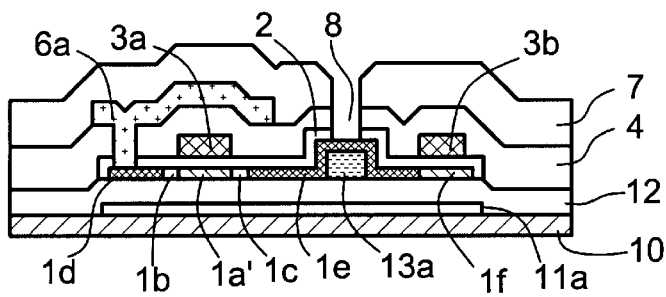
Figure 6S:
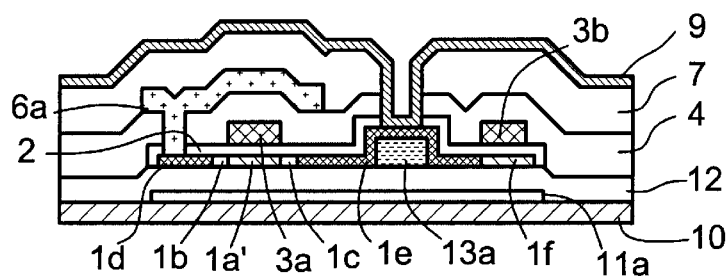
Figure 6T:
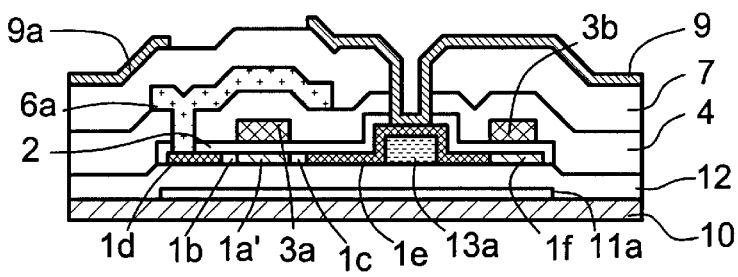
Figure 7A:
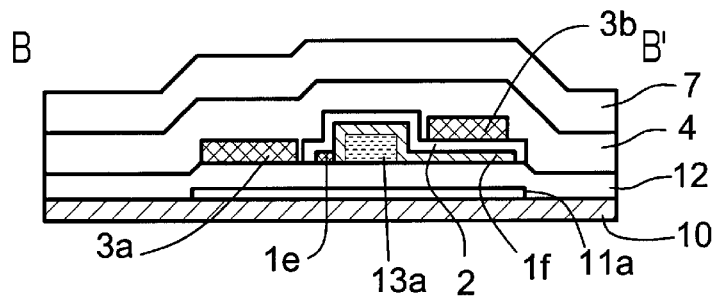
FIG. 7 shows steps (a–d) of a detailed process for constructing the liquid crystal panel according to the embodiment shown in FIG. 2 along the cross section B–B'.
Figure 7B:
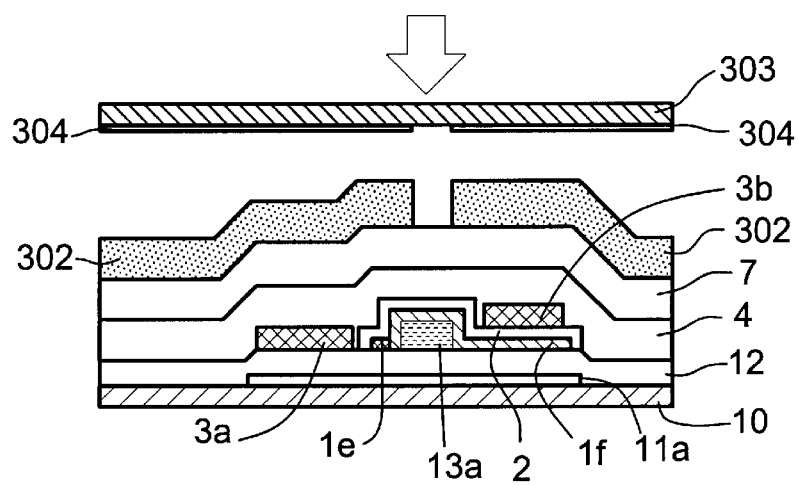
Figure 7C:
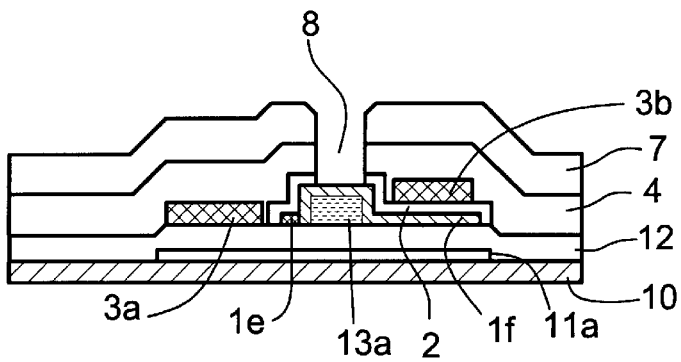
Figure 7D:
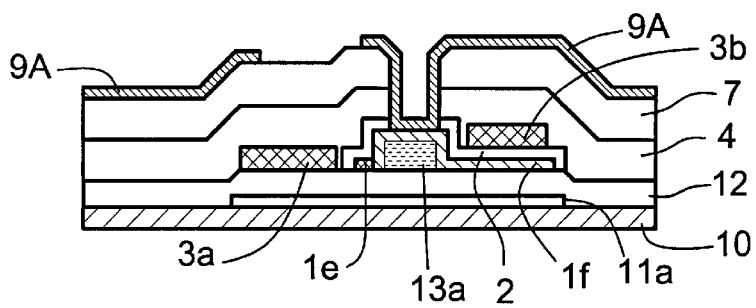

A first embodiment of the invention is explained referring to FIG. 1 through FIG. 3.

FIG. 1 shows an equivalent circuit diagram of a plurality of pixels in a matrix constituting an image display region of a liquid crystal panel. FIG. 2 shows a plan view of a group of adjoining pixels on a TFT array constituting the liquid crystal panel, and FIG. 3 shows the cross section along the line A–A' shown in FIG. 2, indicating the structure of a TFT switching element. The relative sizes of respective layers and members may be different in reality, but have been drawn to clearly show each of the elements.

A plurality of pixels formed into a matrix constituting the image display region of the liquid crystal panel comprises more than one TFT 30 for controlling the pixel electrodes 9a as shown in FIG. 1. Data lines 6a supply image signals to the source of the TFTs 30. The image signals to be written in the data lines 6a may be successively supplied in the order of lines S1, S2 through Sn or may be simultaneously supplied to adjoining data lines 6a for each group. A scanning line 3a contacts the gate of each TFT 30, to provide scanning pulse signals on the scanning lines 3a in the order of lines G1, G2 through Gm according to a given timing. The pixel electrodes 9a electrically contacts the drain of a corresponding TFT 30 and image signals transferred from the corresponding data line 6a are stored in a given timing by closing the TFT 30 for a given time interval. The image signals with a desired level are stored in the liquid crystal between the pixel electrode 9a and opposing electrodes (described below) formed on an opposing substrate for a given time interval. Change of orientation of the liquid crystal between the pixel electrode 9a and opposing electrodes in response to the voltage level modulates the light transmitted and/or reflected by the liquid crystal panel. A capacitor 70 is added in parallel with the liquid crystal capacitor formed between the pixel electrode 9a and the opposing electrode in order to prevent leakage of the retained image signals, thereby further improving the retention characteristic to provide a liquid crystal panel with a high contrast ratio. The capacitor 70 may be formed by providing a capacitor line 3b as a wiring line for forming the capacitor or the capacitor may be formed between an adjacent scanning line 3a.

According to the first embodiment, the plan layout of the pixels constituting the image display region of the liquid crystal panel has a construction as shown in FIG. 2, including a plurality of pixel electrodes 9a arranged in a matrix, a plurality of data lines 6a aligned along the X-direction and extending in the Y-direction, and a plurality of scanning lines 3a aligned along the Y-direction and extending in the X-direction. A channel region 1a' (indicated by hatch lines drawn from the bottom to the left-top in FIG. 2) of the semiconductor layer 1a of the TFT 30 is formed at the cross point between the SXth data line 6a and scanning line 3a. The source region of the TFT 30 electrically contacts the data line 6a via the contact hole 5. The drain region of the semiconductor region 1a extends toward the adjoining (SX+1)th data line 6a to form a first capacitor electrode 1f. The first capacitor electrode if forms a capacitor between the capacitor line 3b using the gate insulation film as a dielectric. The capacitor line 3b extends along the scanning line 3a in the X-direction outside of the image display region. When the capacitor line 3b is likewise elongated from the drain region of the semiconductor layer 1a under the adjoining data line 6a to form the first capacitor electrode if, capacitance can be effectively added in the light non-permeable (opaque) region of the liquid crystal panel where wiring lines are formed, thereby improving the ability for retaining charges written in the pixels and to provide a liquid crystal panel with a high contrast ratio. In addition, the order of the SXth and (SX+1)th data lines 6a can be reversed.

A contact hole 8 for electrically contacting the drain region of the semiconductor layer 1 a with the pixel electrode 9a is provided between the scanning line 3a and capacitor line 3b. The area where the disclination of the liquid crystal is generated by the step formation of the contact hole 8 is integrated with the same area as the disclination by the horizontal direction electric field that is generated between the adjacent pixel electrodes 9a.

Therefore, a contact hole 8 can be effectively provided in the area where the light had to be shielded conventionally. A conductive lift-up film 13a made of a polysilicon film or a high melting point metal film made of W (tungsten), Ti (titaniurn), Cr (chromium), Mo (molybdenum) and Ta (tantalum) or an alloy film thereof may be provided as an etching stopper at the portion defined by a bold line in FIG. 2 just under the contact hole 8. The process described above is provided in order to prevent fatal pixel defects from occurring when the contact hole 8 penetrates through the semiconductor layer 1a in opening the contact hole 8, provided for putting the drain region of the semiconductor layer 1a into electrical continuity with the pixel electrode 9a, by an etching process. It is an advantage of this process that the semiconductor layer 1a can be thinned to improve transistor characteristics and to form a semiconductor layer that is less affected by the photoelectric effect of incident light. A part of the lift-up film 13a is formed so as to surround the contact hole 8, but the lift-up film 13a is not overlapped with the scanning line 3a and capacitor line 3b. When there is little margin between the contact hole 8 and the scanning line 3a or capacitor line 3b, at least one of the scanning line 3a or capacitor line 3b may be made to form a two-dimensional depression (depressed in a plane) along the regions where the conductive film is provided as shown in FIG. 2 so that the scanning line 3a and capacitor line 3b are not overlapped with the lift-up film 13a. Providing the contact hole 8 approximately at the center between the adjoining SXth data line 6a and (SX+1)th data line 6a enables to prevent the data line 6a and the pixel electrode 9a from forming a short circuit with each other, largely reducing the possibility of fatal defects such as point defects and line defects due to faults in the TFT 30.

Forming at least the channel region 1a' of the TFT 30 and junctions between the channel region 1a' and the source-drain region beneath the data line 6a in the liquid crystal panel according to the first embodiment allows the channel region 1a' and junctions between the channel region 1a' and the source-drain region not to be directly irradiated with incident light. A first light shielding film 11a (indicated by hatch lines from the bottom to the top-left in FIG. 2) made of a high melting point metal film such as W (tungsten), Ti (titanium), Cr (chromium), Mo (molybdenum) and Ta (tantalum) or an alloy thereof, or a polysilicon film is further provided via the interlayer insulation film beneath the TFT 30, so that at least the channel region 1a' of the TFT 30 and junctions between the channel region 1a' and the source-drain region are not directly irradiated with incident light. This construction prevents a leak current generated by irradiating the TFT 30 with the light reflected by a polarizer after permeating through the opening. This means that leak current arising from a photoelectric effect in the semiconductor layer 1a can be prevented even in the presence of intense light projected to enhance the luminous energy efficiency, which is especially effective for liquid crystal projectors. It is recommended that a constant potential such as an earth potential is impressed on the first light shielding film 11a in order to prevent deterioration of transistor characteristics of the TFT 30. When an earth line is connected to a constant potential line such as power source lines for feeding electricity to auxiliary circuits provided at the periphery of the image display region, no external circuit connecting terminals and distribution wiring lines for exclusive uses are needed, thereby effectively using the space on the TFT array substrate.

FIG. 3 represents a cross section viewed along the line A–A' in FIG. 2, showing the three-dimensional structure of the TFT 30 and capacitor 70. The TFT 30 has a LDD (Lightly Doped Drain) structure provided with a scanning line 3a including a gate electrode, a channel region 1a' of a semiconductor layer 1a where channels are formed by the electric field from the scanning line 3a, a thin insulation film 2 including a gate insulating film for insulating the scanning line 3a from the semiconductor layer 1a, a low concentration source region 1b (source side LDD region) and a low concentration drain region 1c (drain side LDD region) of the semiconductor layer 1a, and a high concentration source region 1d and a high concentration drain region 1e of the semiconductor layer 1a. The data line 6a contacts the high concentration source region 1d and a corresponding pixel electrode 9a contacts the high concentration drain region 1e. The low concentration source region 1b and the high concentration source region 1d, and the low concentration drain region 1c and the high concentration drain region 1e are formed by doping a prescribed concentration of n-type or p-type impurity ions in the semiconductor layer 1a as will be described hereinafter depending on whether n-type or p-type channels are formed. The n-channel type TFT has an advantage that its access speed is rapid, and is frequently used for the TFT 30. The data line 6a is preferably made of a light-shielding film such as a metal film of Al or an alloy film such as an alloy film of a metallic silicide. A second interlayer insulation film 4 is formed on the scanning line 3a, the thin insulation film 2 and the first interlayer insulation film 12. The data line 6a electrically contacts the high concentration source region 1d via a contact hole 5. A third interlayer insulation film 7 is formed on the data line 6a and the second interlayer insulation film 4. The pixel electrode 9a electrically contacts the high concentration drain region 1e via the contact hole 8. The pixel electrode 9a described above is provided on the top face of the third interlayer insulation film 7 described above. The high concentration drain region 1e of the semiconductor layer 1a is provided just under the contact hole 8 while the conductive lift-up layer 13a is provided under the high concentration drain region 1e. Fatal defects can be avoided by the construction described above even when the high concentration drain region 1e of the semiconductor region 1a has been penetrated through when etching the contact hole 8 because the high concentration drain region 1e electrically contacts the conductive lift-up layer 13a on the underlayer. Since it is preferable that the region where the contact hole 8 is formed is as flat as possible, the film thickness of the scanning line 3a, capacitor line 3b and lift-up film 13a are preferably uniform. The lift-up film 13a extends into the space between the scanning line 3a and capacitor line 3b as shown in FIG. 2 so as to form as flat a region as possible. This construction does not create steps on the surface of the second interlayer insulation films 4 and the third interlayer insulation films 7 under the pixel electrode 9a near the contact hole 8 and between the scanning line 3a and capacitor line 3b, thus diminishing the region where disclination of the liquid crystal is generated and increasing the pixel aperture ratio. The lift-up film 13a may be provided on the high concentration drain region 1e, not under the high concentration drain region 1e. When such a lift-up film 13a is simultaneously formed with the data line 6a using the same material as used in the data line 6a, the lift-up film 13a can be formed without increasing processing steps. When the film thickness of the data line 6a is adjusted to be approximately the same as the film thickness of the data line 6a or scanning line 3a, flattening of the films is better effected.

While the TFT 30 has preferably an LDD structure as described above, an offset structure may be made in which no impurity ions are implanted into the low concentration source region 1b and low concentration drain region 1c, or the TFT may be a self-aligning type TFT in which a high concentration of impurity ions are implanted using the gate electrode formed as a part of the scanning line 3a as a mask followed by forming high concentration source and drain regions.

Two gate electrodes formed as a part of the scanning line 3a, receiving two identical signals and serving as resistors aligned in series, may be provided between the high concentration source region 1d and high concentration drain region 1e in the construction of the TFT 30 shown in FIG. 3, thus forming a TFT with a dual-gate (double gate) structure. This construction allows leak current in the TFT 30 to be reduced. Otherwise, the TFT with the dual-gate structure may be turned into the foregoing LDD structure or offset structure to additionally reduce leak current in the TFT 30, thereby providing a high contrast ratio. The dual-gate structure allows the TFT to be endowed with redundancy to largely diminish pixel defects besides providing an image quality with a high contrast ratio even under high temperature operation. Optionally, three or more gate electrodes may be provided between the high concentration source electrode Id and high concentration drain region 1e.

Although the polysilicon layers such as the channel region 1a', low concentration source region 1b and low concentration drain region 1c of the semiconductor layer 1a usually generate electric current by the photoelectric transfer effect and cause degradation of transistor characteristics, incident light (the light from the top in FIG. 3) irradiating at least the channel region 1a' and the low concentration source region 1b and the low concentration drain region 1c in the semiconductor region 1a can be effectively protected in this embodiment since the data line 6a is formed of a light shielding metal film such as Al so as to cover the scanning line 3a from its upper side. Projection of back light (the light reflected back from the bottom in FIG. 3) to at least the channel region 1a' and the low concentration source regions 1b and low concentration drain region 1c can be effectively prevented since a first light shielding film 11a is provided under the TFT 30.

A capacitor 70 is provided for each pixel electrode 9a as shown in FIG. 1. This capacitor 70 is, in more detail, composed of a first capacitor electrode 1f extending from the high concentration drain region 1e of the semiconductor layer 1a, a dielectric film formed by the same step as forming the thin insulation film 2, the second capacitor electrode formed as a part of a capacitor line 3b formed by the same step as forming the scanning line 3a (gate electrode), and a part of the pixel electrode 9a opposite the capacitor line 3b and separated by the second interlayer insulation film 4 and the third interlayer insulation film 7. Providing this capacitor 70 enables a highly precise display even when the duty ratio is small. The capacitor line 3b is provided on the surface of the TFT array substrate 10 approximately in parallel relation to the scanning line 3a as shown in FIG. 2. Providing the first light shielding film 11a under the first capacitor electrode 1f via the first interlayer insulation film 12 as shown in the present embodiment allows the first interlayer insulation film 12 to serve as a dielectric film to increase capacitance, thereby providing a liquid crystal panel with a high image quality.

The production process of the liquid crystal panel having the construction as hitherto described will be explained hereinafter referring to FIG. 4 through FIG. 7. FIG. 4 through FIG. 6 represent a set of process steps (a–t) by which each layer at the side of the TFT array substrate in respective steps is related to the cross section along A–A' in FIG. 2. A set of process steps by which each layer at the side of the TFT array substrate related to the cross section along B–B' in FIG. 2 is shown in FIG. 7. The sizes and scales of respective layers and members in FIG. 4 through FIG. 7 may be different in reality, but the elements have been drawn to clearly depict all of the elements.

The production process of the portions including the TFT 30 corresponding to the cross section along A–A' in FIG. 2 will be described hereinafter referring to FIG. 4 through FIG. 6.

As shown in step (a) in FIG. 4, a TFT array substrate 10 such as a quartz substrate or a hard glass substrate is prepared. It is preferable that the substrate is subjected to annealing as a pre-treatment at a high temperature of 900 to 1300 (C. in an inert gas atmosphere such as N2 (nitrogen) in order to reduce distortion of the TFT array substrate 10 in the high temperature process to be applied later. That is, the TFT array substrate 10 is heat-treated at a temperature corresponding to the highest heat-treatment temperature in the production process or more for the purpose of adaptation.

A light-shielding film 11—a metal film such Ti (titanium), Cr (chromium), W (tungsten), Ta (tantalum), Mo (molybdenum) and Pb (lead) or a metallic alloy film such as silicide—is deposited by sputtering to a film thickness of 1000 to 5000 Å, preferably 2000 Å, on the whole surface of the TFT array substrate 10 that has been treated as described above. However, deposition of the light-shielding film 11 is not needed when a light having a luminous energy at a level that does not cause cross-talk is used.

Then, a mask corresponding to the pattern of the light-shielding film 11a is formed by photolithography on the deposited light-shielding film 11 as shown in step (b). The first light-shielding film 11a is formed by applying an etching treatment to the light-shielding film 11 through the mask. The first light-shielding film 11a may be formed as islands or in stripes extending along the scanning lines or data lines. Resistance of the first light-shielding film 11a can be reduced when it is formed into a grid pattern.

In the next step as shown in step (c), a first interlayer insulation film 12 comprising a silicate glass film such as NSG (a silicate glass film not containing boron and phosphorous), PSG (a silicate glass film containing phosphorous), BSG (a silicate glass containing boron) and MPSG (a silicate glass film containing phosphorous and boron), a silicon nitride film, or a silicon oxide film is formed on the first light-shielding film 11a by, for example, a reduced pressure or atmospheric pressure CVD method using TEOS (tetraethyl orthosilicate) gas, TEB (tetraethyl borate) gas, or TMPO (tetramethyl oxyphosphate) gas. The film thickness of this first interlayer insulation film is, for example, 8000 to 15000 Å.

Then, as shown in step (d), a conductive film 13 is deposited by a reduced pressure CVD or sputtering. The conductive film 13 comprises a polysilicon film, a film of a high melting point metal such as W (tungsten), Ti (titanium), Cr (chromium), Mo (molybdenum) and Ta (tantalum), or an alloy film thereof. Film thickness of the conductive film 13 may be adjusted to be the same film thickness as the scanning line and capacitor line to be deposited in the following steps, the advantage of which will be described hereinafter.

Then, as shown in step (e), a photolithographic step and etching step are applied so that a lift-up film 13a is left behind at just under the pixel electrode 9a and semiconductor layer 1a in the following steps. The lift-up film 13a is provided for the purpose of preventing any defects caused by penetration of contact holes, provided for putting the pixel electrode 9a into electrical contact with the drain region of the semiconductor layer 1a, through the semiconductor layer by etching. However, there will be no problem if the lift-up film 13a is provided under the contact hole 8 for putting the pixel electrode into electrical contact with the drain region of the semiconductor layer 1a.

Then, as shown in step (f), an amorphous silicon film is deposited on the lift-up film 13a in a relatively low temperature atmosphere of about 450 to 550 (C., preferably at 500 (C., by a reduced pressure CVD (for example, CVD with a pressure of about 20 to 40 Pa) using monosilan gas or disilan gas with a flow rate of about 400 to 600 cc/min. The polysilicon film 1 is grown in solid phase to a thickness of about 500 to 2000 Å, preferably about 1000 Å, thereafter by applying an annealing treatment in a nitrogen atmosphere at a temperature of about 600 to 700 (C. for about 1 to 10 hours, preferably 4 to 6 hours. A small amount of impurity ions of group V elements such as Sb (antimony), As (arsenic) and P (phosphorous) may be doped during the growth step by an ion-implantation method for forming an n-channel type TFT 30. When the TFT 30 is p-channel type, on the other hand, a small amount of the impurity ions of group III elements such as B (boron), Ga (gallium) and In (indium) may be doped by an ion implantation method. The polysilicon film 1 may be directly deposited by the reduced pressure CVD method without forming the amorphous silicon film. Otherwise, the polysilicon film 1 may be once turned into an amorphous state by implanting silicon ions into the deposited polysilicon film using the CVD method, followed by recrystallization by an annealing treatment to form the polysilicon film 1. Silicon nuclei may be grown in solid state by an annealing treatment by laser irradiation using, for example, an excimer laser.

A desired pattern of an island-shaped semiconductor layer 1a is then formed by a photolithographic process or etching process as shown in step (g). Not only the channel region and source-drain region to serve as switching elements, but also a region to serve as one electrode of a capacitor are collectively formed during this step.

As shown in step (h), a heat oxidation film with a relatively thin film thickness of 100 to 500 Å is formed by heat-oxidizing the semiconductor layer 1a at a temperature of about 900 to 1300 (C., preferably at about 1000 (C., followed by depositing a high-temperature oxidized silicon oxide film or a silicon nitride film with a relatively thin film thickness of about 100 to 1000 Å by a reduced pressure CVD method to form a thin insulation film 2 having a multi-layer structure. Consequently, the semiconductor layer 1a has a thickness of about 200 to 1500 Å, preferably about 350 to 500 Å, while the thin insulation film 2 has a thickness of about 200 to 1500 Å, preferably about 300 to 1000 Å. Shortening the high-temperature oxidation time interval as described above prevents the substrate from being warped especially when a large size substrate of about 8 inches in diameter is used. However, the thin insulation film 2 with a single layer structure may be formed merely by heat-oxidizing the polysilicon film 1, or a silicon nitrate film may be used in order to endow the gate insulation film 2 with high voltage resistance.

Figure 8:
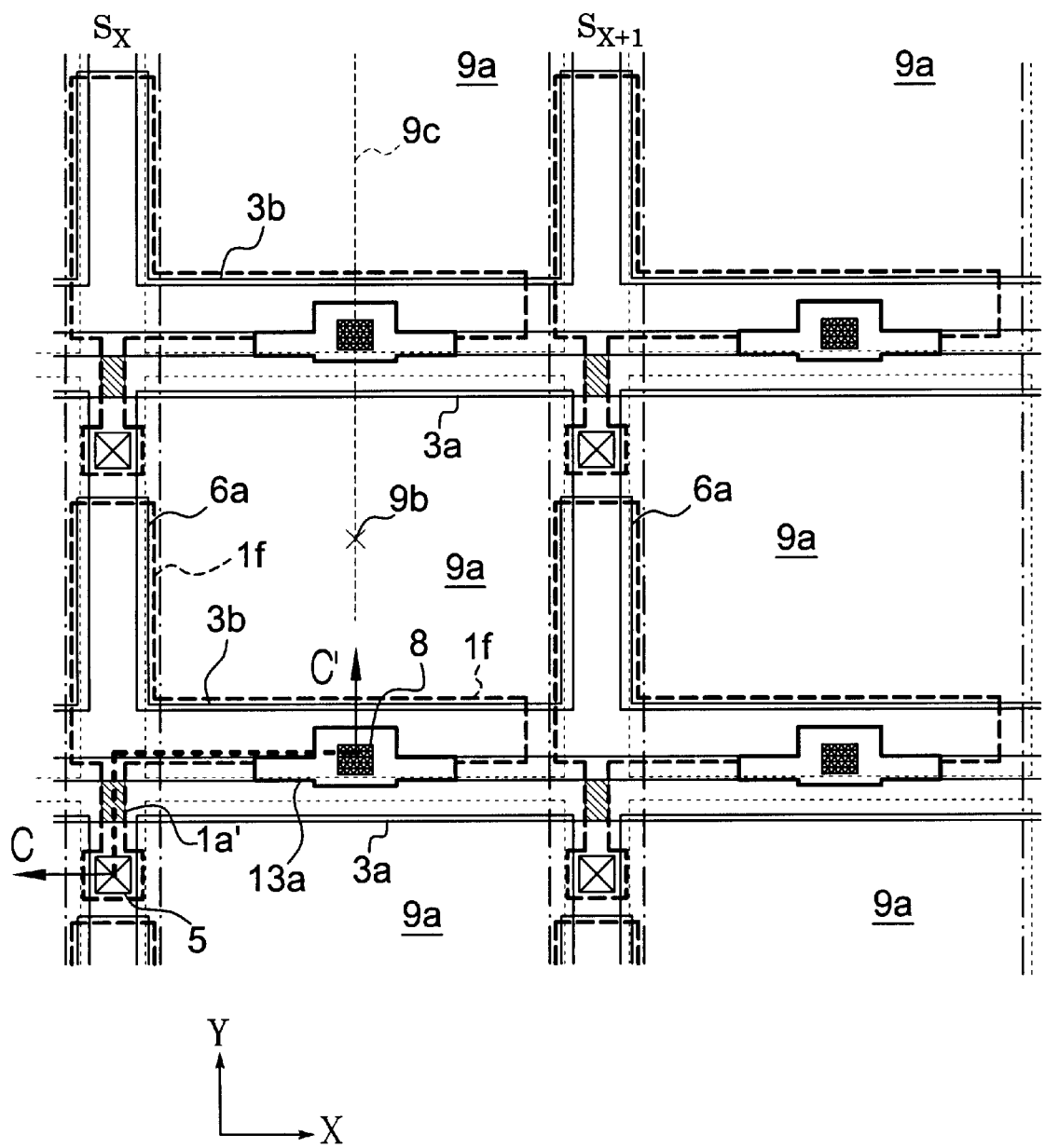
FIG. 8 shows a plan view of a group of pixels on a TFT array substrate of a liquid crystal panel in a second embodiment of the invention.

As shown in step (i) in FIG. 5, the polysilicon film 3 is turned into a conductive film by heat-diffusion of P(phosphorous) after depositing the polysilicon film 3 by a reduced pressure CVD method. Otherwise, a doped silicon film in which P-ions are introduced simultaneously with deposition of the polysilicon film 3 may be used. As shown in step (j), the scanning line 3a and capacitor line 3b with patterns as shown in FIG. 8 are formed by a photolithographic process using a mask and an etching process. The scanning line 3a has a film thickness of, for example, about 1000 to 8000 Å. By adjusting the film thickness of the scanning line 3a to approximately the same film thickness as that of the lift-up film 13a, the shape of the opening of the contact hole can be prevented from being broadened.

The scanning line 3a may be formed of a high melting point metal film such as W or Mo or a metal silicide film, or a multi-layer structure may be formed by combining these metal films or metal silicide with a polysilicon film. When the scanning line 3a is disposed as a light shielding film corresponding to a part or overall region covered with the second light shielding film 22 shown in FIG. 3, a part of or whole of the second shielding film 22 may be omitted by taking advantage of light shielding property of the metal films and metal silicide film. It is especially advantageous to prevent the pixel aperture ratio from being diminished by adhering the opposing substrate 20 with the TFT array substrate 10.

When the TFT 30 is constructed as an n-channel type TFT with the LDD structure as shown in step (k), impurity ions 300 of group V elements such as P are doped at a low concentration (for example, P ions with a dosage of 1 to 3 (1013/cm2) using the scanning line 3a as a diffusion mask for forming the low concentration source region 1b and low concentration drain region 1c, thereby turning the semiconductor layer 1a under the scanning line 3a into the channel region 1a'. The semiconductor layer 1a under the capacitor line 3b (the second capacitor electrode) serves as the first capacitor electrode 1f by making use of the thin insulation film 2 as a dielectric substance. P ions may be previously implanted into the portion for forming the first capacitor electrode 1f in order to have a low resistance.

After forming a resist layer 302 on the scanning line 3a using a mask with a wider width than the scanning line 3a in order to deposit the high concentration source region 1d and high concentration drain region 1e as shown in step (l), impurity ions 301 of group V elements such as P are also doped in high concentration (for example, P ions with a dosage of 1 to 3 (1015/cm2). When the TFT 30 serves as a p-channel type, the region of the n-channel type TFT 30 is protected by covering with the resist and steps (k) and (l) are repeated again. The semiconductor layer 1a is doped with group III elements such as B for forming the low concentration source region 1b and low concentration drain region 1c, and high concentration source region 1d and high concentration drain region 1e. The TFT having such LDD structure is advantageous for reducing the short-channel effect. The TFT may be an offset structure TFT without applying a low concentration doping or may be a self-aligning type TFT by an ion implantation of P ions or B ions using the gate electrode as a mask.

Auxiliary addressing circuits having a complementary structure comprising the n-channel type TFT and p-channel type TFT can be formed on the TFT array substrate 10 simultaneously with the steps described above. The present embodiment is advantageous in that the auxiliary addressing circuits such as the data line addressing circuits and scanning line circuits can be formed by the same steps as forming the TFT 30.

The second interlayer insulation film 4 comprising a silicate glass film such as NSG, PSG, BSG and BPSG, a silicon nitride film or a silicon oxide film is formed so as to cover the scanning line 3a and capacitor line 3b as shown in step (m) using, for example, atmospheric pressure or reduced pressure CVD method and TEOS gas. The film thickness of the second interlayer insulation film 4 may be as thick as possible for not endowing the film with a inter-wiring capacity, preferable thickness being from 5,000 through 15,000 Å.

After applying an annealing treatment at about 1,000 (C. for 20 minutes for activating the semiconductor layer 1a as shown in step (n), the contact hole 5 for the data line 6a is formed by a dry etching process, such as reactive ion etching or reactive ion-beam etching. It is advantageous that the contact hole 5 is allowed to open by an anisotropic etching process like reactive ion etching or reactive ion-beam etching since the shape of the opening is similar to that of the mask. Forming the opening by a combination of dry etching and wet etching allows the contact hole 5 to have a tapered shape, which is advantageous in that wire breakage during wiring connection can be prevented. Contact holes for putting the scanning line 3a into electrical contact with wiring lines (not shown in the drawing) are allowed to open on the second interlayer insulation film 4 by the same step as forming the contact hole 5.

A metal containing film 6 such as a low-resistance metal film of opaque Al or a metal silicide film is deposited on the second interlayer insulation film 4 as shown in step (o) in FIG. 6 by, for example, a sputtering process to a thickness of about 1,000 to 8,000 Å, preferably to a thickness of about 3,000 Å.

The data line 6a is formed by a photolithography process and an etching process as shown in step (p). Applying dry etching such as reactive etching and reactive ion-beam etching in the etching process is advantageous since overetching is suppressed to allow precise patterning in accordance with the mask dimensions.

The third interlayer insulation film 7 comprising a silicate glass such as NSG, PSG, BSG and BPSG, silicon nitride film or silicon oxide film is deposited as shown in the step (q) so as to cover the data line 6a using an atmospheric pressure or reduced pressure CVD method and TEOS gas. It is recommended that the third interlayer insulation film 7 be relatively thick, preferably about 5,000 to 15,000 Å, so that no capacitance is present between the data line 6a and pixel electrodes 9a to be formed in a post-processing step. Since disclination of the liquid crystal is sometimes generated due to steps on the TFT 30 as a wiring line and switching element, a flat film may be deposited by spin-coating an organic film or SOG (spin-on-glass) instead of, or over, the silicate glass film constituting the third interlayer insulation film 7, or a CMP(Chemical Mechanical Polishing) treatment may be by applied. Such construction allows the disclination generating region of the liquid crystal to be reduced as small as possible, providing a high pixel aperture ratio even when the pixels are made fine.

The contact hole 8 for electrically contacting the pixel electrode 9a with the high concentration drain region 1e is formed by dry etching such as reactive ion etching or reactive ion-beam etching as shown in step (r). Opening the contact hole 8 by anisotropic etching such as reactive ion etching or reactive ion-beam etching is advantageous since the shape of the opening can be adjusted to be approximately the same as that of the mask. However, forming the opening by a combination of dry etching and wet etching is more advantageous for preventing wire breakage during wiring connection since the shape of the contact hole 8 can be tapered. Because not only the high concentration drain region 1e of the semiconductor region but also the lift-up film 13a as a conductive film are placed just under the region where the contact hole 8 is opened, penetration of the contact hole 8 through the semiconductor layer 1a does not cause any defects in the liquid crystal panel. Providing a lift-up film 13a allows the channel region 1a' of the semiconductor layer 1a to be a thin film, making it possible to improve characteristics of the element.

A transparent conductive thin film 9 such as ITO (Indium Tin Oxide) film with a thickness of about 500 to 2,000 Å is deposited on the third interlayer insulation film 7 by a sputtering treatment as shown in step (s), followed by forming the pixel electrode 9a by a photolithographic process or etching process as shown in step (t). When the liquid crystal panel 100 is used as a reflection-type liquid crystal device, the pixel electrode 9a may be formed of an opaque material having a high reflection index, such as Al. However, a flattening treatment such as a CMP treatment should be applied in forming the third interlayer insulation film 7 to provide the pixel electrode 9a with a mirror face.

After coating the surface of the pixel electrode 9a with a polyimide-based orientation film, an orientation film 23 as shown in FIG. 3 is formed by applying a rubbing treatment in a prescribed direction so that the film has a prescribed pre-tilt angle.

A glass substrate is provided for the opposing substrate 20 shown in FIG. 3, on which a second light-shielding film 22 is formed by a photolithographic process and etching process after sputtering, for example, metallic chromium on the substrate 20. The second light-shielding film 22 may be formed of, other than a metallic material such as Cr, Ni and Al, carbon or a black resin in which Ti is dispersed in photoresist. When a light shielding film is formed on the TFT array substrate 10, the opening region is prescribed on the TFT array substrate 10, eliminating the need for providing the second light shielding film 22 on the opposing substrate 20. Therefore, the accuracy in placing the TFT array substrate 10 with respect to the opposing substrate 20 can be neglected thus providing a liquid crystal panel with a uniform transmittance.

An opposing electrode 21 is formed thereafter by depositing the transparent conductive thin film such as ITO at a thickness of about 500 to 2,000 Å over the whole surface of the opposing substrate 20 by a sputtering treatment. After additionally coating the whole surface of the opposing electrode 21 with a coating of a polyimide-based orientation film, the orientation film is formed by applying a rubbing treatment along a prescribed direction so that the film has a prescribed pre-tilt angle.

Finally, the TFT array substrate 10 and opposing substrate 20, on which the foregoing layers are formed, are adhered with each other with a seal member, with which gap materials comprising glass fibers or glass beads having a given particle size (for example 1 to 6 (m) are mixed, so that the orientation film 23 face each other. A liquid crystal prepared by mixing more than one kind of nematic liquid crystal is provided in the space between both substrates by vacuum suction to form a liquid crystal layer having a desired thickness.

The production process for opening the contact hole 8 to be provided at the region between the scanning line 3a and capacitor line 3b will be described hereinafter. FIG. 7 represents a cross sectional view along the line B—B shown in FIG. 2. The steps (a) to (d) in FIG. 7 will be described in comparison with the steps (a) to (d) in FIG. 17.

As shown in step (a) in FIG. 7, the area where the contact hole 8 on the third interlayer insulation film 7 is to be formed is relatively flat as a result of making the film thickness of the scanning line 3a, capacitor line 3b and lift-up film 13a uniform.

Then, light is exposed with a stepper apparatus using a photo mask 303 as shown in step (b) in FIG. 7. When the resist 302 is a positive type resist, the portion of the photo mask 303 where there is no light-shielding chromium film 304 (or the portion where the light passes) is removed. The light is not irregularly reflected during exposure since the area where the contact hole 8 is formed is relatively flat. Accordingly, the region on the third interlayer insulation film 7 where there is no light-shielding chromium film 304 on the resist 302 is removed, or a portion of the resist 302 is removed that is the same size as the pattern diameter for forming the contact hole. Therefore, the resist 302 is not over-removed as shown in the conventional example of FIG. 17B, making it possible to form the contact hole as designed. Consequently, production yield is not lowered when pixels are made fine, providing a liquid crystal panel with a high pixel aperture ratio.

Widening of the diameter of the contact hole 8 is suppressed as much as possible by forming the contact hole 8 using an anisotropic process, etching such as reactive etching or reactive ion-beam etching as shown in step (c) in FIG. 7. The diameter of the opening is not widened when a wet etching is used to form the side wall of the contact hole 8 into a tapered shape because the resist 302 is not over removed as in the conventional art, making it possible to open a fine contact hole.

Pixels in the image display region of the TFT array are finally formed by providing the pixel electrode 9a as shown in step (d) in FIG. 7.

Figure 9:
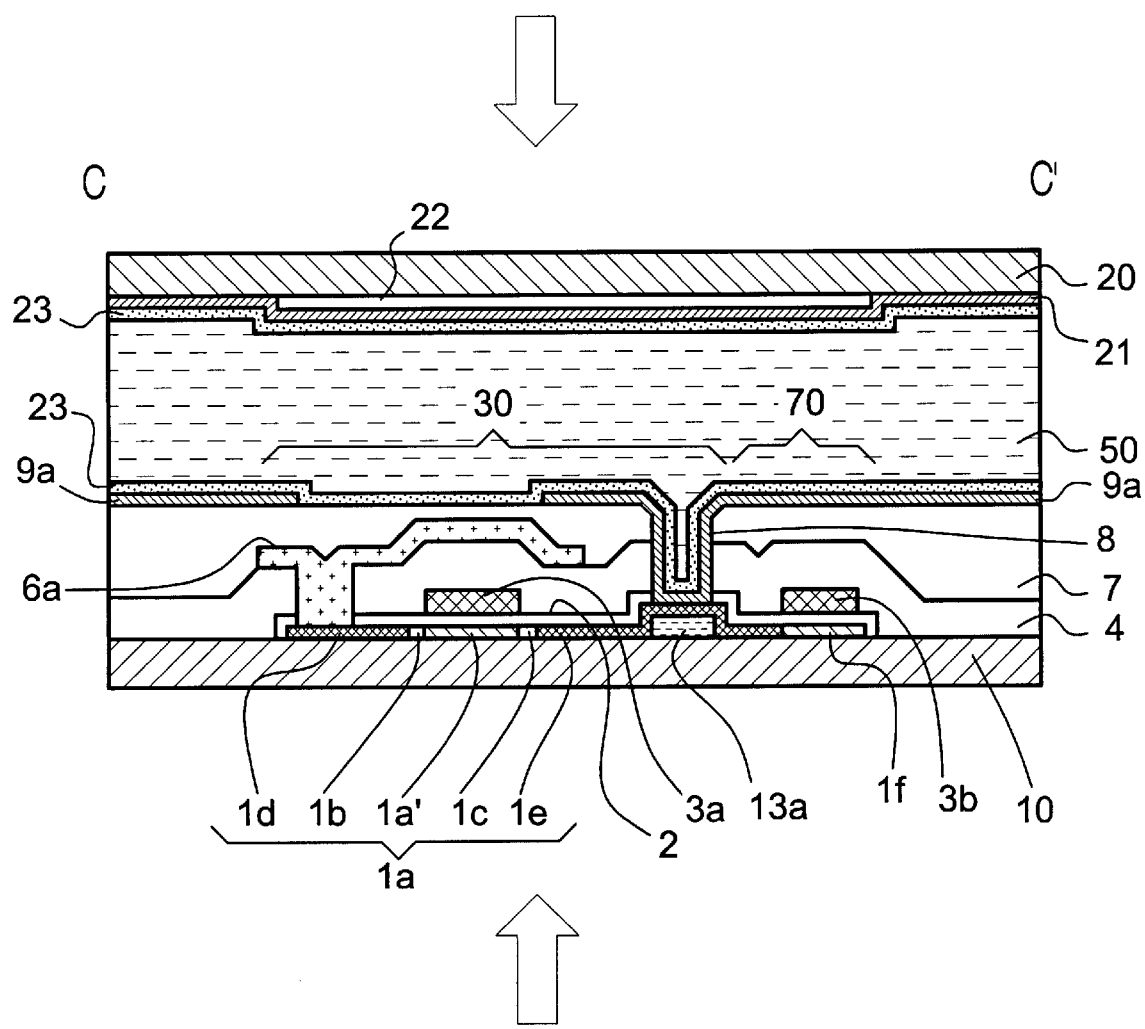
FIG. 9 shows a cross section along the line C–C' in FIG. 8 with the opposing substrate.

The second embodiment of the liquid crystal panel according to the present invention will be described hereinafter referring to FIG. 8 and FIG. 9. FIG. 8 is a plan view showing a group of adjoining pixels on a TFT array substrate constituting a liquid crystal panel. FIG. 9 represents a cross sectional view along the line C–C' shown in FIG. 8 indicating the structure of each layer. Scales and sizes of respective layers and members in FIG. 9 may be different in reality, but have been drawn to provide a clear representation of all elements.

The overall constitution of the liquid crystal panel in the second embodiment is similar to those in the first embodiment shown in FIG. 2 and FIG. 3, except that the first light-shielding film 11a is not placed below of the TFT 30. For example, providing the first light-shielding film 11a is not necessary in the liquid crystal panel such as a direct viewing type liquid crystal panel used when no intense incident light is present or required.

Accordingly, there are no projections on the surface of the TFT array substrate 10 when the first light-shielding film 11a is not provided as shown in FIG. 9. Moreover, the need of forming the first interlayer insulation film 12 is excluded when the substrate is thoroughly cleaned, making it possible to eliminate the steps for forming the first light-shielding film 11a and depositing the first interlayer insulation film 12. In other words, it is effective for improving the production yield and saving production cost because production steps from (a) through (c) in FIG. 4 can be eliminated.

When the third interlayer insulation film 7 itself is formed as a flat structure, or a CMP treatment is applied or a flattened film of an organic film is formed on the third interlayer insulation film as described in the second embodiment, irregular reflection during exposure in the photolithograhy step for forming the contact hole 8 can be prevented, thereby making it possible to provide a fine contact hole 8. The construction as described above makes it unnecessary to allow the film thickness of the lift-up film 13a to be the same as those of the scanning line 3a and capacitor line 3b.

Figure 10:
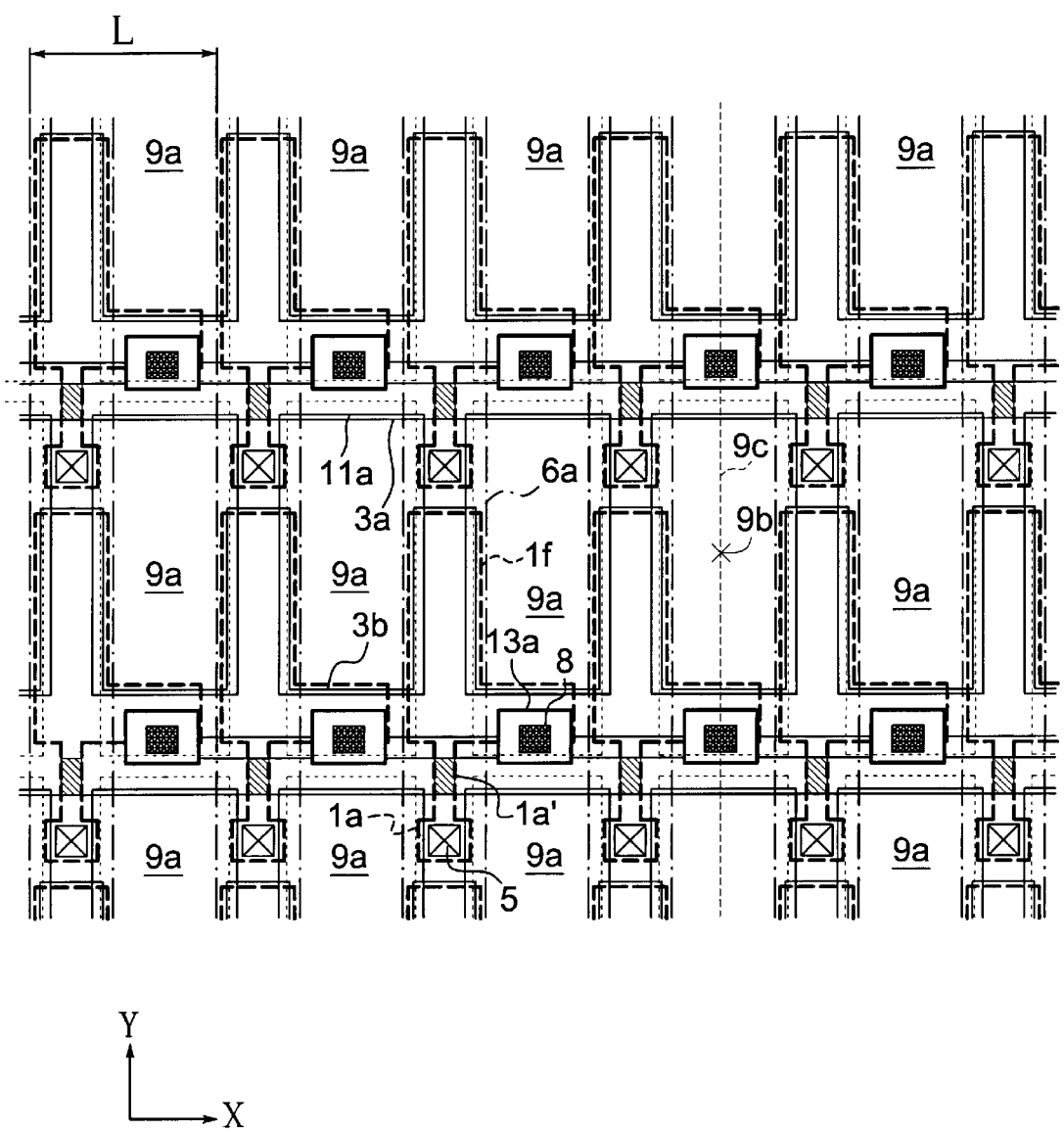
FIG. 10 shows a plan view of a group of pixels on a TFT array substrate of a liquid crystal panel in a third embodiment of the invention.

The third embodiment of the liquid crystal panel according to the present invention will be described hereinafter referring to FIG. 10. FIG. 10 shows a plan view of a group of adjoining pixels on a TFT array of a liquid crystal panel.

The overall construction of the liquid crystal panel in the third embodiment is approximately identical to the first embodiment shown in FIG. 2 and FIG. 3, and shows an example when the pixel pitch along the X-direction is narrow. The pitch is equal to one third of the pixel pitch L shown in the first embodiment. The liquid crystal panel can be used for a single plate projector in which only one sheet of liquid crystal panel mounting color filters is used, or for a display of a notebook-type personal computer in which color filters are provided on the opposing substrate and three pixels correspond to picture element (PEL).

Narrowing the pixel pitch L along the X-direction makes the distance between the data lines 6a shorter, and the pixel electrodes could possibly form short circuits between the data line 6a and the contact hole 8. The possibility of short circuit is markedly increased when the data line 6a is formed of an Al (aluminum) film, because the third interlayer insulation film 7 can not be formed as a porous structure by a high temperature treatment because of the low melting point of the Al film. Accordingly, the etching rate for forming the contact hole 8 is accelerated. Especially, since the side walls of the contact hole 8 are formed into a tapered shape, the diameter of the opening of the contact hole 8 through the third interlayer insulation film 7 tends to be enlarged. When no lift-up film 13a as an etching stopper is provided as in the conventional art and the contact hole 8 is formed by dry etching, the contact hole 8 possibly penetrates through the insulation film, forcing simultaneous use of a wet etching process thus making it difficult to form an opening with a small diameter.

Figure 11:
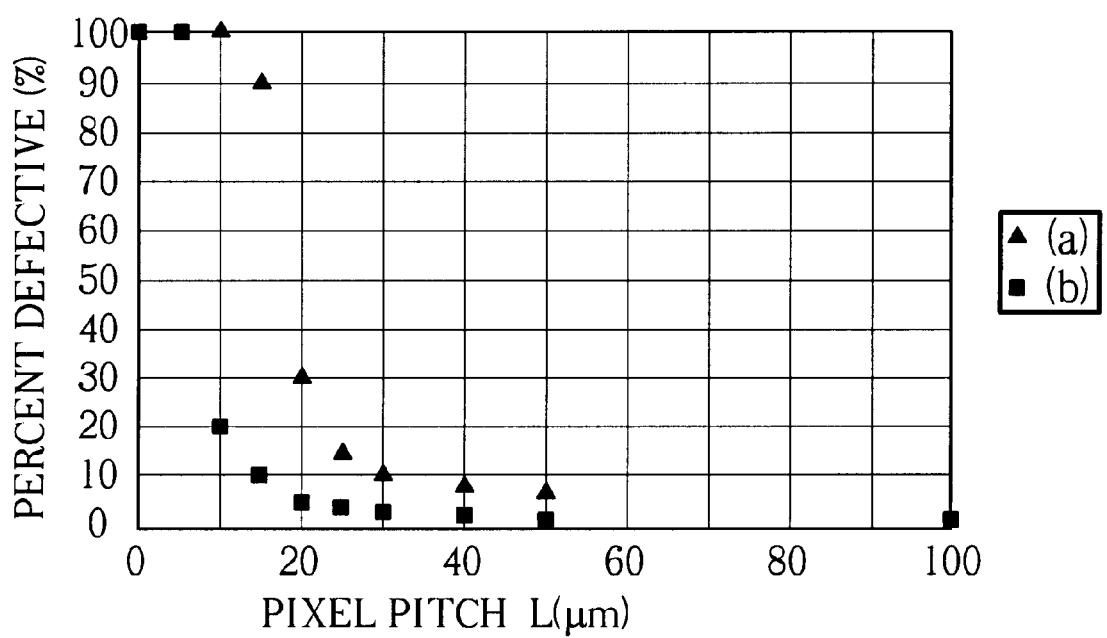
FIG. 11 shows a graph indicating percent defective pixels of a liquid crystal panel versus pixel pitch of the liquid crystal panel for a liquid crystal panel according to the invention and a conventional liquid crystal panel.

The graph indicating the relation between the pixel pitch L and percent defective pixels is shown in FIG. 11, wherein the contact hole 8 has a square shape with its side length of 2 (m and the width of the wiring line of the data line 6a was 5 (m. The marks (a) and (b) in FIG. 11 represent the liquid crystal panels produced by the conventional production process and by the production process according to the invention, respectively. The results indicate that, while the percent defective due to pixel defects rapidly increases when the pixel pitch is 20 (m or less in the conventional example represented by the mark (a), the percentage defective due to pixel defects does not increase before the pitch is reduced to 10 (m or less in the present embodiment. Accordingly, there will arise less short circuits between the data line 6a, scanning line 3a or capacitor line 3b, and the pixel electrode 9a even when the pixels are further made fine or the aperture ratio more enhanced, along with causing reduction of production yield since the contact hole 8 between the drain region of the semiconductor layer 1a and pixel electrode 9a less often penetrate through the insulation layer.

When the distance between the contact hole 8 and the data line 6a is extremely short as shown in the third embodiment, the film thickness of the lift-up film 13a may be designed to have approximately the same thickness as that of the data line 6a, or the interlayer insulation film on the data line 6a may form a flat surface with the area where the contact hole 8 is formed. Disclination of the liquid crystal panel can be reduced by the construction as described above since the diameter of the contact hole 8 is suppressed from being enlarged and the step height is lowered.

According to the present embodiment, the contact hole 8 is formed at a position symmetrical with respect to the center line 9c (refer to FIG. 2, FIG. 8 and FIG. 10) of the opening region. Therefore, the step (see FIG. 3) in the pixel electrode 9a around the contact hole 8 is symmetrical in relation to the opening region. This symmetric relation is especially effective in the use of the TN(Twisted Nematic) type liquid crystal, probabilities of disclination such as a reverse tilt generated in liquid crystals being almost equal when either a dextrorotatory or a levorotatory liquid crystal is used for the liquid crystal layer 50. In other words, using either one of both types of the liquid crystals described above can obviate marked occurrence of disclination.

Figure 16:
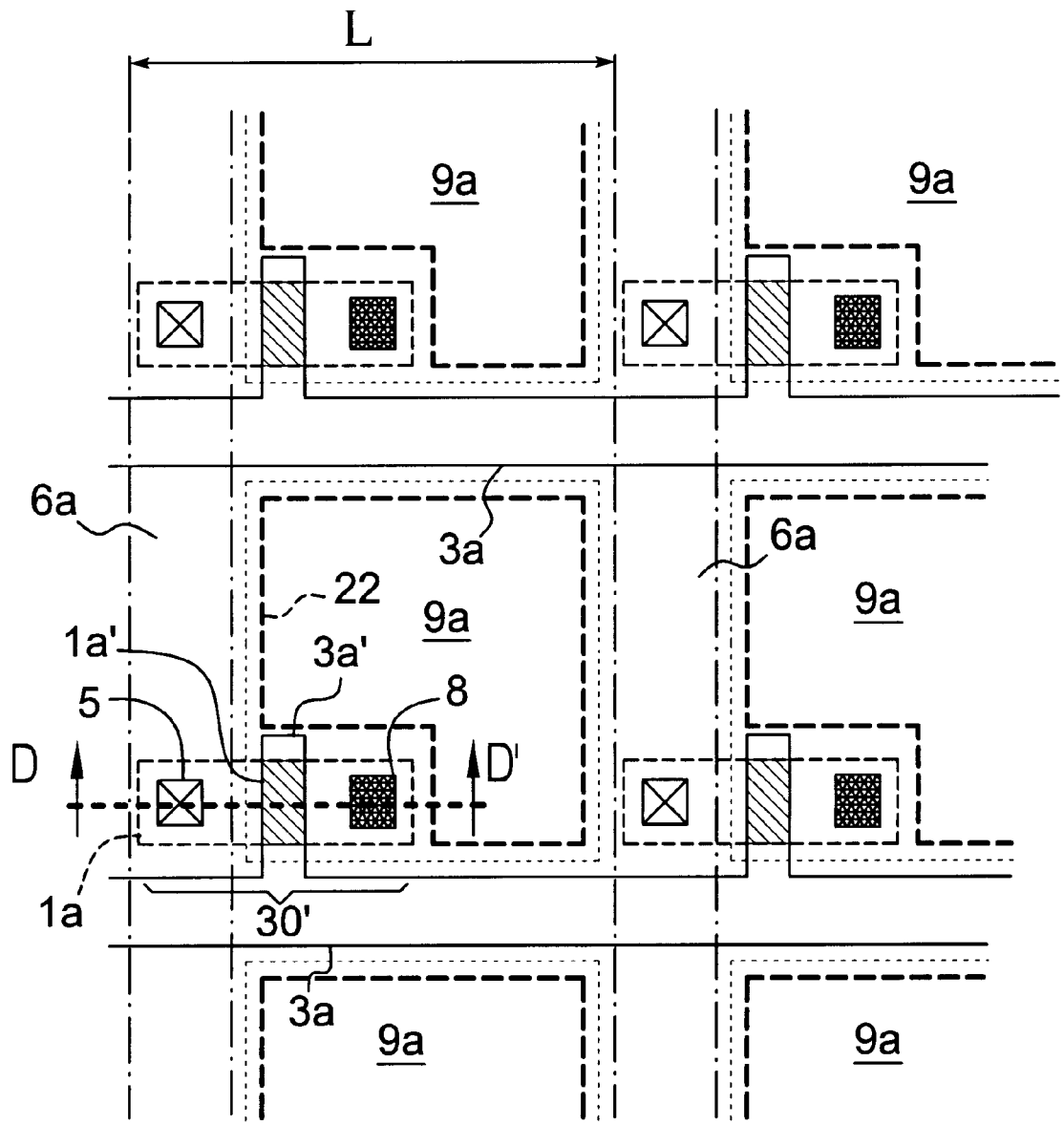
FIG. 16 shows a plan view of a group of adjoining pixels on the TFT array substrate viewed from the opposing substrate side in a conventional liquid crystal panel.
Figure 17A:
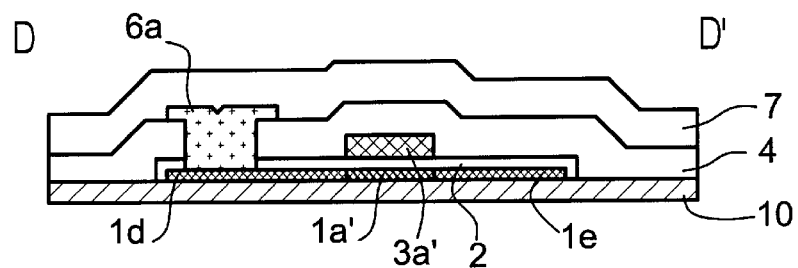
FIG. 17 shows steps (a–d) of a process for constructing the conventional liquid crystal panel viewed along the line D–D' in FIG. 16.
Figure 17B:
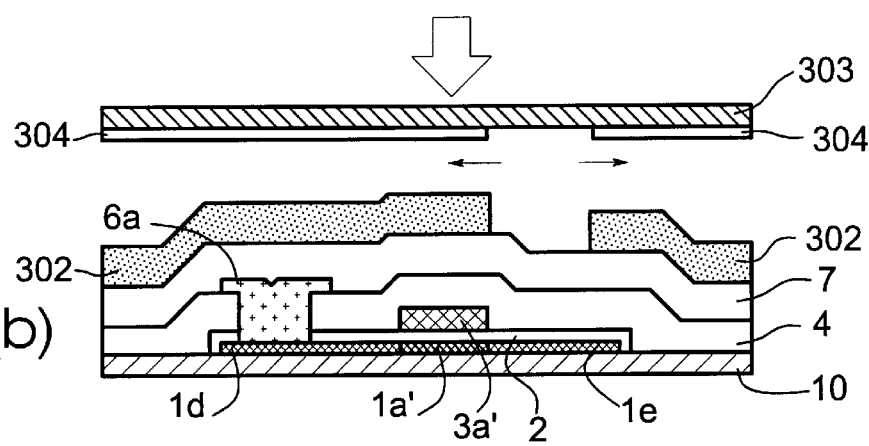
Figure 17C:
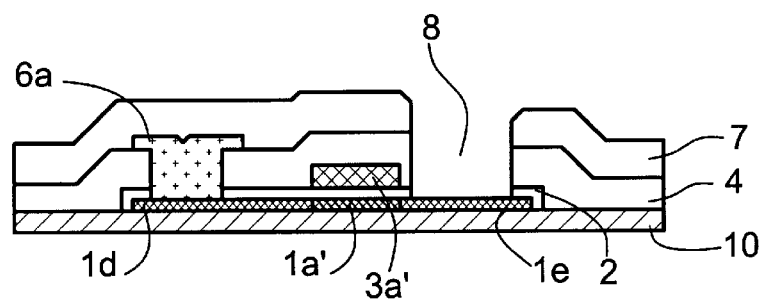
Figure 17D:
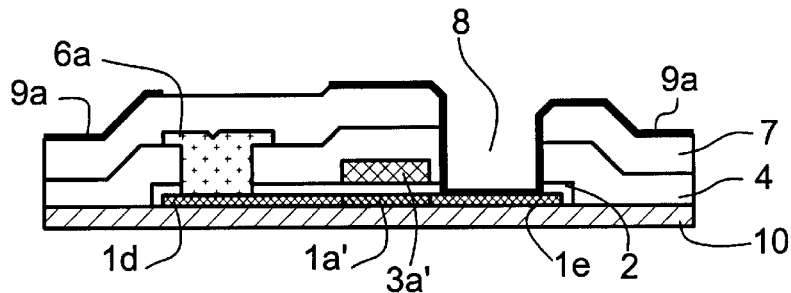

According to the present embodiment as hitherto described, the luminous energy efficiency is improved as compared with the conventional example shown in FIG. 16, wherein the pixel electrodes 9a electrically contact with the drain region of the TFT via the contact holes 8 formed at the corner of each pixel. Since the opening region has a rectangular shape that closely resembles a square, especially in the present embodiment, the proportion of the area irradiated with a light having a circular cross section to the area of the opening region becomes high, thereby improving the luminous energy efficiency. The shape of the opening region may be a symmetrical shape such as a circle, a regular dodecahedron, a regular octahedron, a regular hexahedron or a square. Furthermore, the width of the opening region along the X-direction is defined by the two adjoining data lines 6a and the width of the opening region along the Y-direction is defined by the adjoining scanning line 3a and capacitor line 3b. Therefore, the two dimensional space of the image display region can be efficiently utilized by forming the contact hole 8 at the space positioned between the adjoining scanning line 3a and capacitor line 3b where no opening region is positioned, thus improving the luminous energy efficiency since the opening region can be more efficiently extended.

Figure 12:
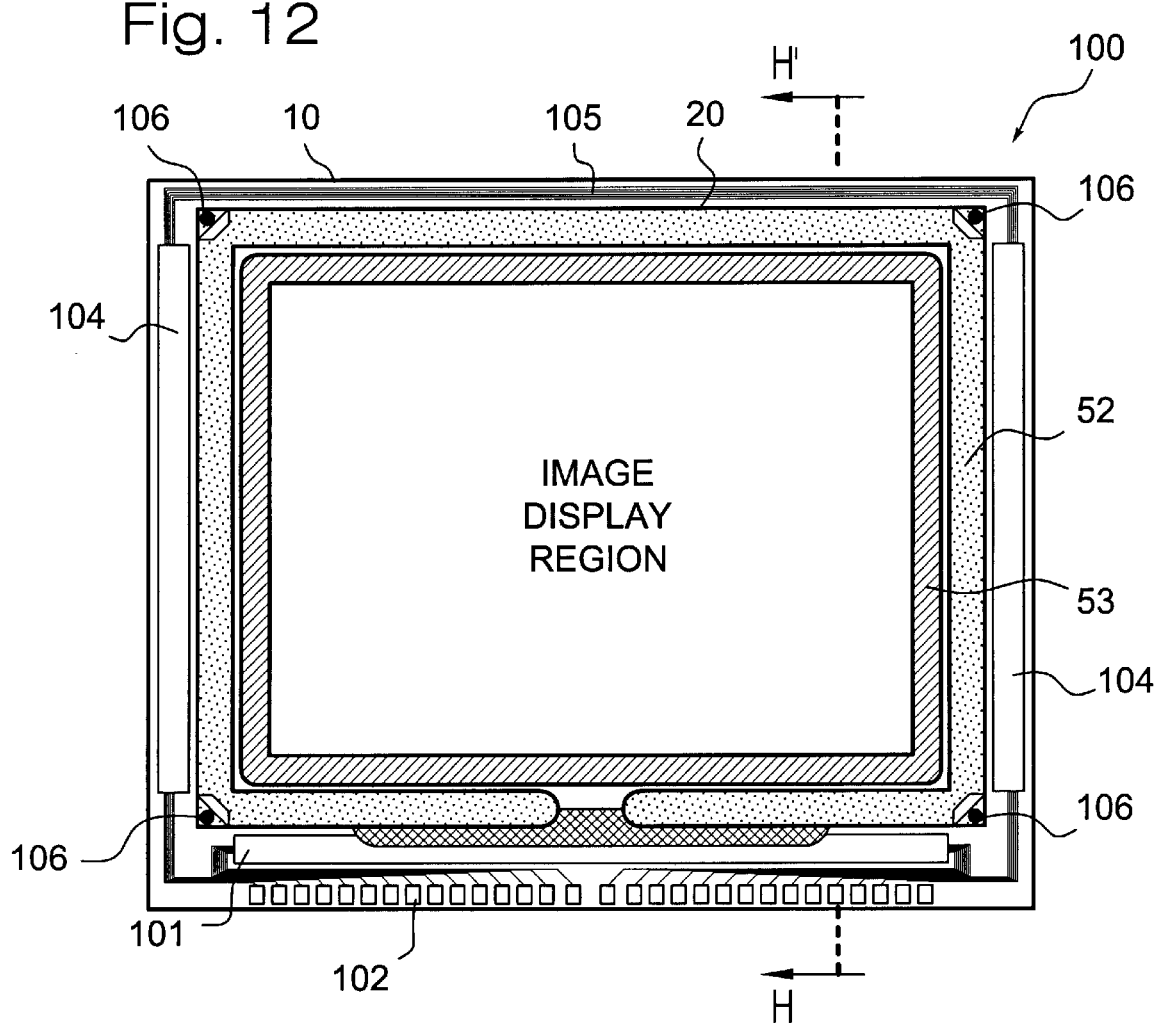
FIG. 12 shows a plan view showing the overall constitution of a liquid crystal panel according to the invention.

Since the liquid crystal panel according to the present embodiment includes a TFT 30 as a switching element or a polysilicon (p-Si) type TFT, auxiliary addressing circuits for addressing pixels on the TFT array substrate can be produced by the same production steps as in forming the TFT 30. The structure of a liquid crystal panel 100 having integrated auxiliary addressing circuits will be described hereinafter with reference to FIG. 12 and FIG. 13. FIG. 12 represents a plan view of the TFT array substrate viewed from the opposing substrate side together with respective elements formed thereon, and FIG. 13 shows a cross section along the line H–H' including the opposing substrate.

As shown in FIG. 12, a third light-shielding film 53 for dividing the image display region is provided on the TFT array substrate 10 and a seal member 52 is provided outside of the peripheral partition 53. A data line addressing circuit 101 and external circuit connecting terminals 102 are provided along one side line of the TFT array substrate 10 at the outer region of the seal member 52. Scanning line addressing circuits 104 are also provided along the two other sides of the liquid crystal panel 100. Wiring 105 for connecting the scanning line addressing circuits 104 provided at both sides of the image display region are provided on another side of the TFT array substrate 10. When signal retardation in the scanning lines does not cause display problems, the scanning line addressing circuit 104 may be provided only at one side of the TFT array substrate 10. The data line addressing circuit 101 can also be provided at both sides of the image display region. Top-to-bottom continuity members 106 are provided at at least one corner of the opposing substrate 20 for putting the TFT array substrate 10 into electrical contact with the opposing substrate 20. As shown in FIG. 13, the opposing substrate 20 having approximately the same contour as the seal member 52 shown in FIG. 12 is adhered to the TFT array substrate 10 by the seal member 52.

The data line addressing circuit 101 and the scanning line addressing circuit 104 are put into electrical contact with the data line 6a and scanning line 3a, respectively, via wiring lines. The data line addressing circuit 101 includes a shift register circuit for successively transferring start signals in response to clock signals, controlling a sampling circuit by the addressing signals successively outputted from the data line addressing circuit 101 and supplying image signals, transformed into a data type that can be instantly displayed, from a display information processing circuit (not shown in the drawing), to the data line 6a via the sampling circuit. The scanning line addressing circuit 104 includes a shift register circuit for successively transferring start signals in response to clock signals, and the data line addressing circuit 101 transfers signal voltages corresponding to the image signals to the data lines 6a in synchronization with sequential transfer of gate voltage pulses to the scanning lines 3a. The sampling circuit may be formed within the data line addressing circuit 101 or may be formed in the region of the third light-shielding film 53. Forming the sampling circuit in the region of the third light-shielding film 53 that has not been utilized allows the space to be effectively used, providing a compact and highly functional data line addressing circuit 101.

Figure 13:
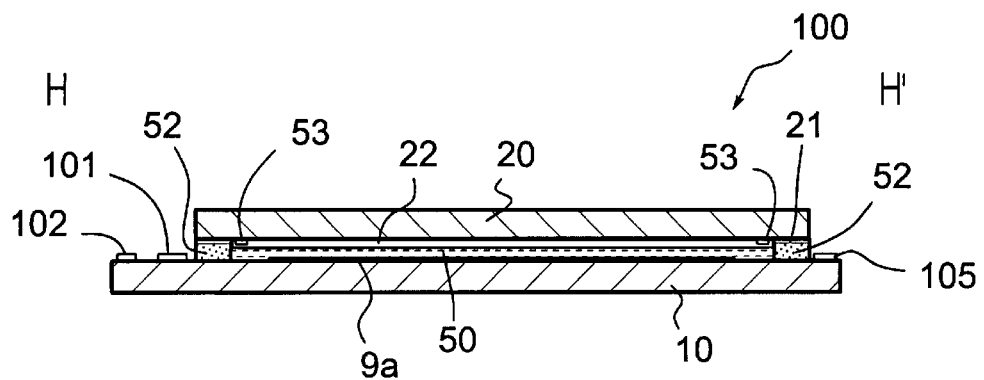
FIG. 13 shows a cross section of the liquid crystal panel shown in FIG. 12 along the line H–H'.

As shown in FIG. 13, the liquid crystal layer 50 comprises a liquid crystal in which several kinds of nematic liquid crystals are mixed together. The seal member 52 is an adhesive comprising, for example, a UV curing resin or a heat curing resin for adhering the TFT array substrate 10 and the opposing substrate 20 with each other. Gap materials (spacers) such as glass fibers or glass beads between the TFT array substrate 10 and the opposing substrate 20 keep the distance (inter-substrate gap) between the TFT array substrates 10 and the opposing substrate 20 at a given gap length. A opposing electrode 21 comprising the second light-shielding film 22 and an ITO film as a transparent conductive film is provided on the side facing the liquid crystal layer 50 of the opposing substrate 20. A polarizing film, a phase difference film or a polarizing plate is disposed at the sides where light is incident on the opposing substrate 20 and at the side where light projects out of the TFT array substrate 10 in a prescribed direction depending on the differences of the operation mode such as a TN mode, a STN (super-TN) mode or a D-STN (double-STN) mode, or in a normally white mode or a normally black mode.

While the liquid crystal layer is composed of a nematic liquid crystal as an example in the liquid crystal panel 100, the orientation film 23, and the polarizing film and polarizing plate as described above are not needed when a polymer dispersion-type liquid crystal in which liquid crystal is dispersed in a polymer as fine droplets is used. This construction allows the liquid crystal panel to be highly luminous or to consume low electricity by enhancing the luminous energy efficiency. The present embodiment is applicable to various kinds of liquid crystals (liquid crystal phases), operation modes, liquid crystal alignments and methods. As hitherto described, the auxiliary addressing circuits for addressing the image display region can be integrated on the TFT array substrate 10 which does not require attaching the auxiliary circuits by packaging tapes and COG, providing a super-compact liquid crystal panel. The number of ICs for addressing the liquid crystal panel can be largely reduced, thus reducing cost.

Figure 14:
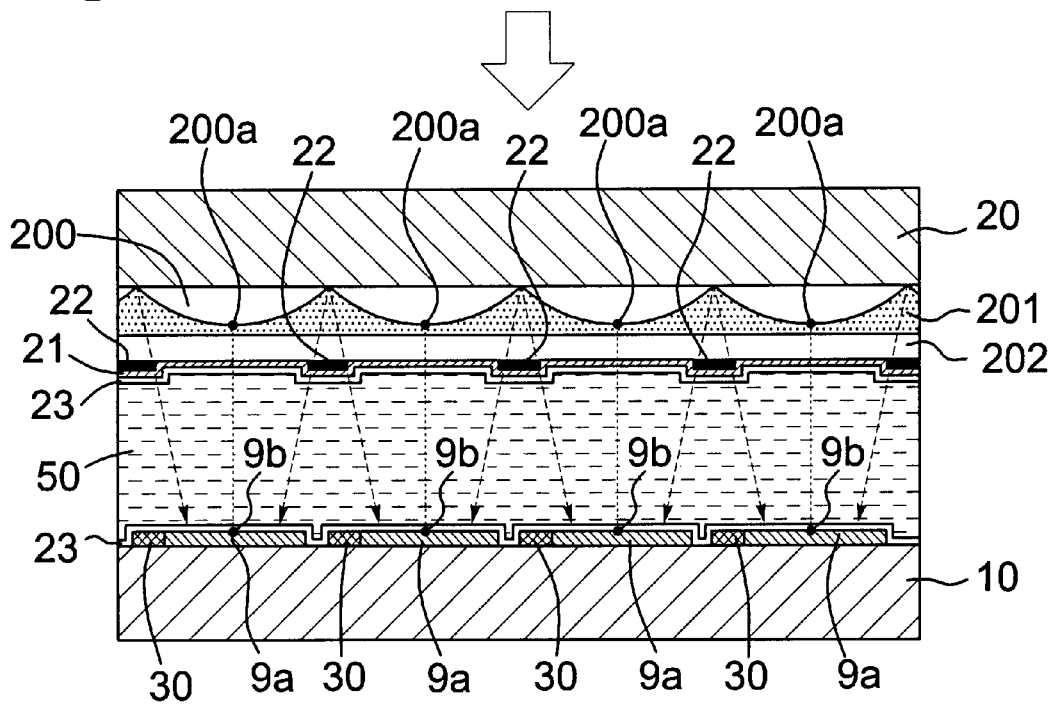
FIG. 14 shows an enlarged cross section of a portion of the opposing electrode on which an example of micro-lenses are formed.

Micro-lenses that are used on some liquid crystal panels can be produced by the method disclosed, for example, in Japanese Unexamined Patent Publication No. 6-194502. One example, liquid crystal panel with micro-lenses 200 is shown in FIG. 14 wherein, after forming a film of a photosensitive substance on the opposing substrate 20 and photo-patterning of the film, a convex portion corresponding to each micro-lens 200 is formed. A smooth convex surface for each micro-lens 200 is formed on the opposing substrate 20 by taking advantage of heat deformation and surface tension properties of the photosensitive substance. The pattern of the micro-lens 200 array of the photosensitive substance is transferred and printed on the opposing electrode 20 thereafter by applying a dry etching process using the micro-lens 200 pattern of the array of the photosensitive substance as a mask, thereby forming a micro-lens 200 on the surface, or the micro-lens 200 may be formed by a traditional so-called "heat deformation method".

A cover glass 202 is adhered on the whole surface of the micro-lenses 200 with an adhesive 201, a second light-shielding film 22, an opposing electrode 21 and an orientation film 23 being further formed in this order thereon. The light-shielding film 22 forms a matrix along the boundary of the micro-lens 200 so that the center of each pixel opening is overlapped with respective lens centers 200a of each micro-lens 200.

Figure 15:
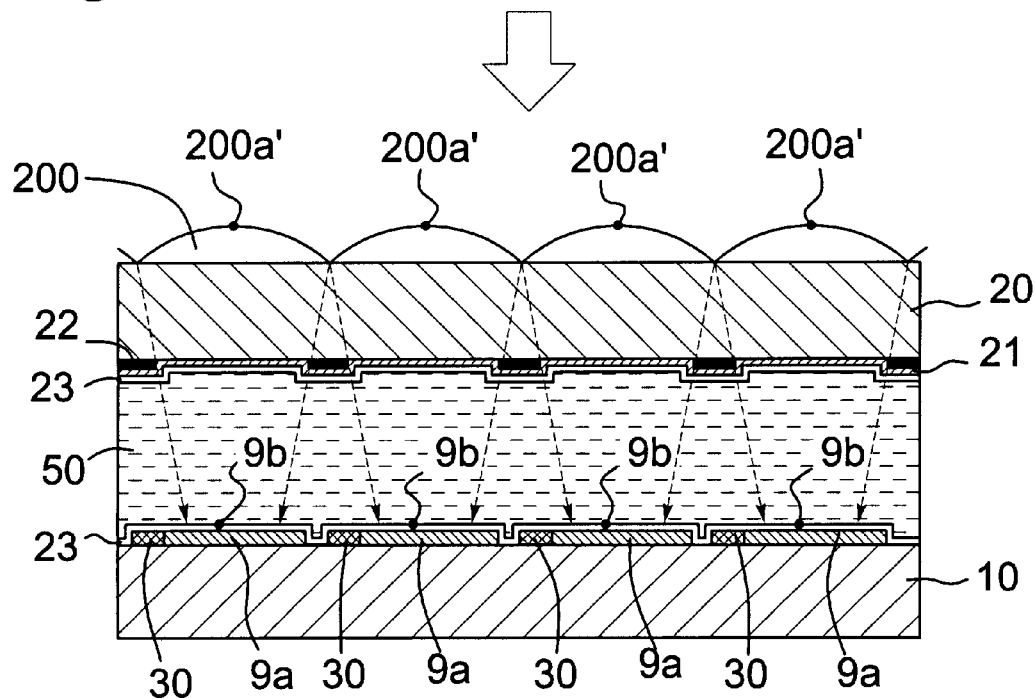
FIG. 15 shows an enlarged cross section of a portion of the opposing electrode on which another example of micro-lenses are formed.

As shown in FIG. 14, the opposing electrodes 21 are formed over the overall surface of the opposing substrate 21. The opposing electrode 21 is formed by depositing an ITO film of a thickness of about 500 to 2000 Å by, for example, sputtering treatment followed by a photolithographic process and an etching process. The orientation film 23 comprises an organic thin film such as a polyimide thin film. A rubbing treatment is applied to the orientation film 23 along a given direction so as to form scratches having a given direction. The second light-shielding film 22 is provided at a prescribed region opposing the TFTs 30. The second light-shielding film 22 is formed by a sputtering step using a metallic material such as Cr and Ni, a photolithographic step and an etching step, or by using a black resin in which carbon or Ti is dispersed in a photoresist. The second light-shielding film 22 has functions, besides the light-shielding effect for the semiconductor layer 1a of the TFT 30, for improving contrast and for preventing mixing of colorants. Alternatively, as shown in FIG. 15, micro-lenses 200', formed by adhering a transparent plate (a micro-lens array), on which convex faces of each lens has been previously formed, on the surface of the opposing substrate 20. Such micro-lenses 200' may also be adhered on the face facing to the liquid crystal layer 50 of the opposing substrate 20.

The opening region of the pixel electrode 9a especially has a symmetrical shape relative to the center line 9c passing through the nearly central point 9b of the opening region, as shown in FIG. 2, FIG. 8 and FIG. 10. The contact hole 8 is also formed at a position symmetrical with respect to the center line 9b of the opening region. The micro-lens 200 (or 200') has a lens center 200a (or 200a') at the position approximately opposing the central point 9b.

According to the present embodiment, the light incident from the opposing substrate 20 side is condensed on the pixel electrode 9a around the approximate center point 9b of the opening region with the micro-lens 200 (or 200') having a lens center 200a (or 200a') at the position approximately opposite the center point 9b (center of gravity) of the opening region. Therefore, a circular (or approximately circular or ellipsoidal) light irradiation region is formed within the opening region by the light condensed by the micro-lens 200 (or 200'). The contact hole 8 is formed at a position so as to be symmetrical in relation to the central line 9c of the opening region, thereby it is possible to have a wide symmetrical opening region positioned at around the center of each pixel. Since the opening region is symmetrical in relation to the central line 9c passing approximately through the central point 9b, a circular light irradiation region is formed at a symmetrical position in the opening region (or the center of the circle approximately overlaps the center point 9b). Accordingly, the ratio of the light irradiation region relative to the opening region is high, improving the luminous energy efficiency. The light condensation ability of the micro-lens 200 may be sufficient for accommodating the light irradiation region just within the opening region and the light irradiation region is not smaller than required.

Although the present embodiment is constructed so as to address the pixel electrode 9a using a TFT 30, using an active matrix element such as TFD (Thin Film Diode) other than the TFT is possible. The liquid crystal panel can be also constructed as a passive matrix type liquid crystal panel. So long as light is condensed on the pixel electrode with the micro-lens as described above, the structure, in which the lens center is approximately opposite the center point of the opening region improves luminous energy efficiency.

Embodiments of electronic appliances provided with the liquid crystal panel according to the invention will be described hereinafter referring to FIG. 18 to FIG. 21.

Figure 18:
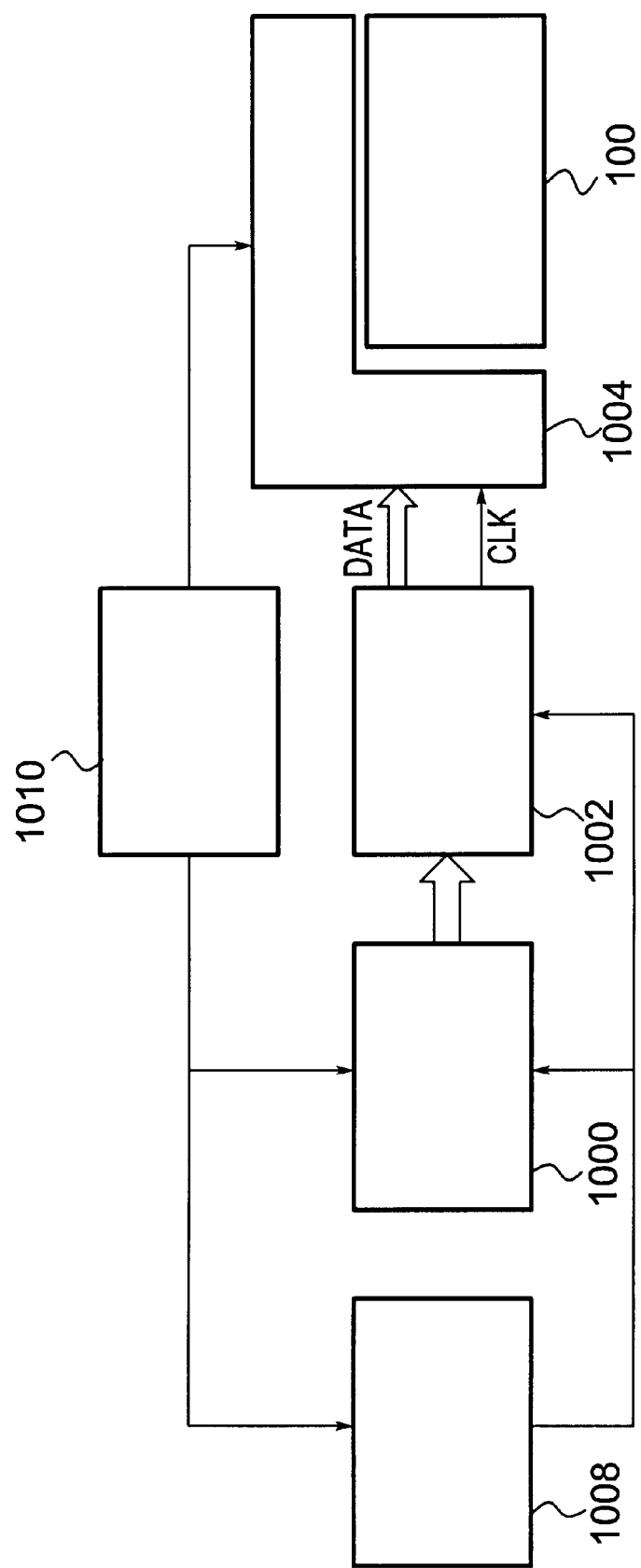
FIG. 18 shows a block diagram of an embodiment of an electronic appliance according to the invention.

The electronic appliance shown in the schematic block diagram of FIG. 18 includes a display information output source 1000, a display information processing circuit 1002, an addressing circuit 1004, a liquid crystal panel 100, a clock generation circuit 1008 and a power source circuit 1010. The display information output circuit includes memories such as ROM (Read Only Memory), RAM (Random Access Memory) and an optical disk device, and a tuning circuit for tune-output of image signals. Display information such as image signals having a prescribed format is transferred to the display information processing circuit 1002 based on the clock signals from the clock generation circuit 1008. The information processing circuit 1002 comprises various kinds of conventional processing circuits such as an amplification-polarity inversion circuit, a serial-parallel conversion circuit, a rotation circuit, a gamma-correction circuit and a clamping circuit, successively creating digital signals from display information inputted based on the clock signal to output the signals to the addressing circuit 1004 together with the clock signal CLK. The addressing circuit 1004 addresses the liquid crystal panel 100. The power circuit source 1010 supplies a constant power to respective circuits described above. The addressing circuit 1004 may be mounted on the TFT array substrate constituting the liquid crystal panel 100 or the display information processing circuit 1002 may be additionally mounted.

Examples of the electronic appliance described above will be shown in FIG. 19 to FIG. 21.

Figure 19:
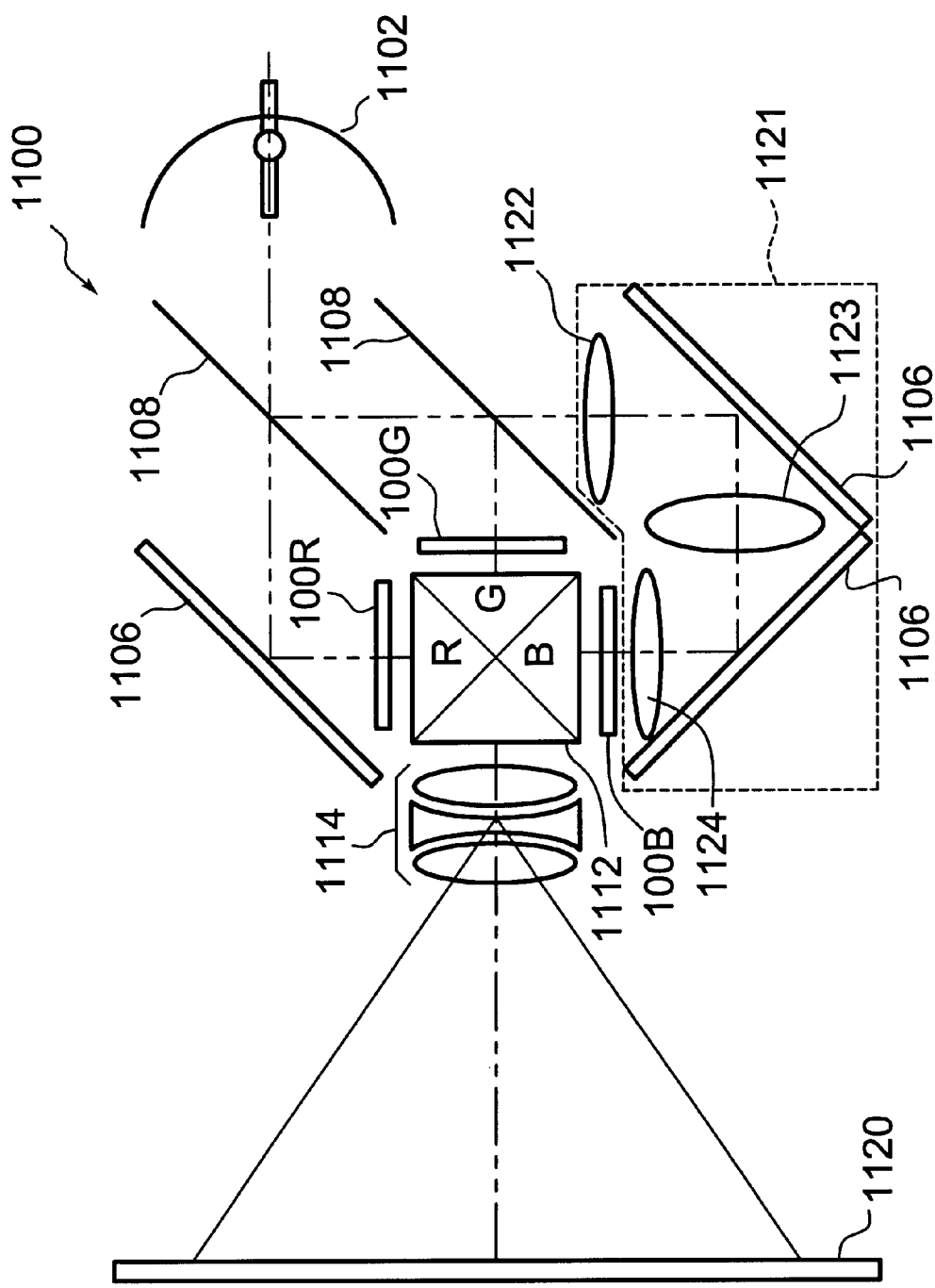
FIG. 19 shows a cross section of a liquid crystal projector as one example of an electronic appliance.

FIG. 19 shows a liquid crystal projector 1100 including liquid crystal panels as light valves 100R, 100G and 100B for RGB (Red, Green and Blue) lights, respectively. The projected light from a lamp unit 1102 as a white light source such as a metal halide lamp is split into light components of R, G and B by three mirrors 1106 and two dichroic mirrors 1108 in the liquid crystal projector 1100. Each of the RGB light beams are guided to light valves 100R, 100G and 100B, respectively, corresponding to respective colors. The light B is guided via a relay lens system 1121 comprising a incident lens 1122, a relay lens 1123 and a output lens 1124 in order to prevent luminous energy loss by passing through a long optical path. The light components modulated by the light valves 100R, 100G and 100B, respectively, are projected to a screen 1120 via a projection lens 1114 after being synthesized by the dichroic prism 1112.

The channel region of the TFTs for switching the pixel electrodes can be sufficiently shaded especially in the present embodiment by providing a light-shielding film under the TFT as previously described, even when the reflected light from the projection optical system within the liquid crystal projector based on the projected light from the liquid crystal panel 100, the reflected light from the surface of the TFT array substrate when the projection light goes through, and a part of the projected light (a part of the R and G lights) penetrating through the dichroic prism 1112 after being output from the other liquid crystal panels 100 are incident in as back light from the TFT array substrate side. Accordingly, adhering an AR(Anti Reflection) film for blocking the back light between the TFT array substrate and prism of each liquid crystal panel, or applying an AR coating film treatment on the polarized plate is not required even when a prism suitable for compacting is used for the projection optical system, which is advantageous for compacting and simplifying the construction.

Aligning the direction of distinct vision of the liquid crystal panel constituting the three light valves 100R, 100G and 100B allows occurrence of irregular colors or decrease of contrast to be suppressed. Therefore, only the light valve 100G among the light valves 100R, 100G and 100B should be horizontally rotated in the direction of distinct vision of the liquid crystal when a TN liquid crystal is used as a liquid crystal. However, when the light valve provided with the liquid crystal panel according to the present embodiment is used, the configuration of the opening of the pixels becomes nearly identical to the dextrorotatory or levorotatory liquid crystals irrespective of either type of the TN liquid crystal, thereby enabling to equally recognize the image even when disclination of the liquid crystal is generated. The constitution described above provides a liquid crystal projector that produces high quality images when the lights from the light valves 100G, 100R and 100B are synthesized by the prism, since occurrence of irregular colors or decrease of contrast on the display image is not caused.

Figure 20:
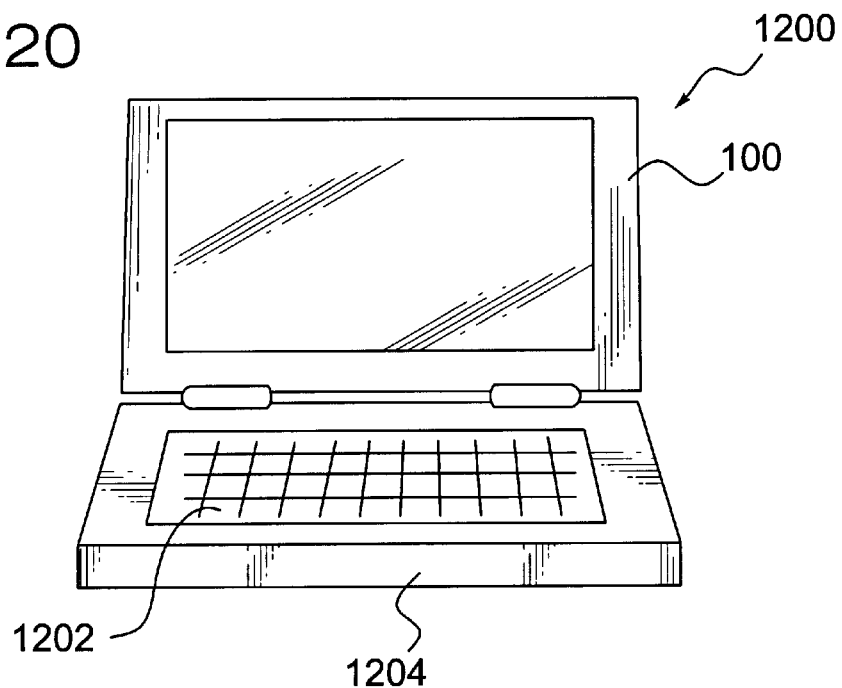
FIG. 20 shows a front view of a personal computer as one example of an electronic appliance.

A multimedia compatible laptop type personal computer (PC) 1200 as an example electronic appliance shown in FIG. 20 is also provided with the foregoing liquid crystal panel 100 in its top cover case, which accommodates a CPC, a memory device and a modem along with providing a main unit into which a keyboard is integrated.

Figure 21:
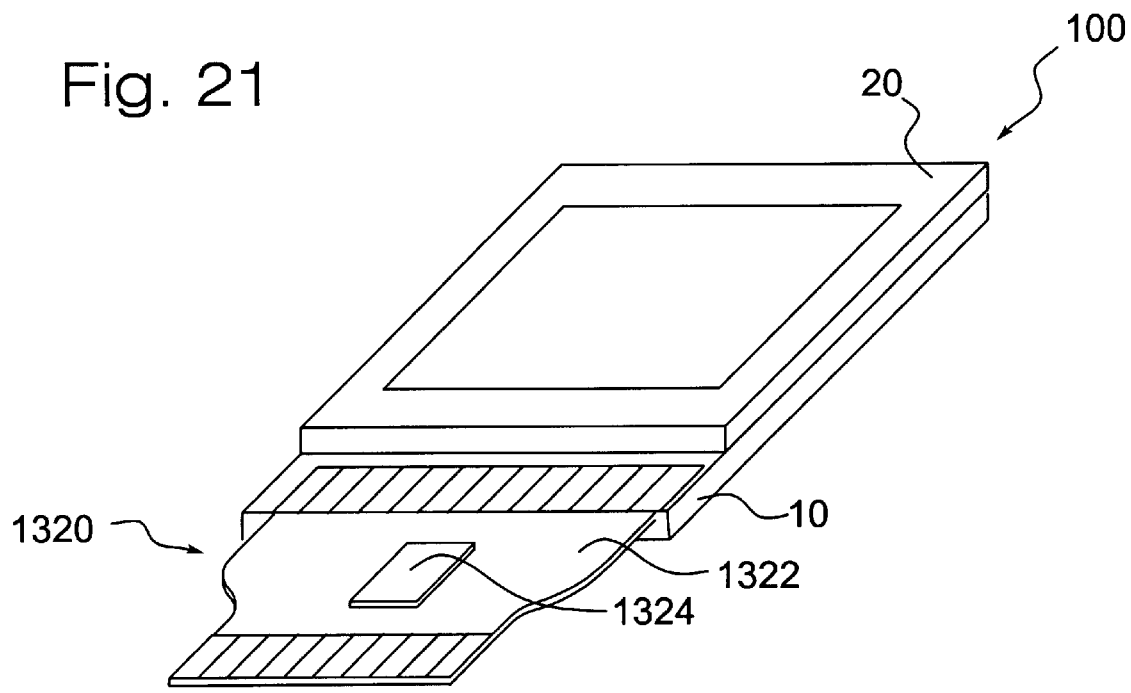
FIG. 21 shows a perspective view of a liquid crystal device using TCP as one example of an electronic appliance.

When the addressing circuit 1004 and display information processing circuit 1002 are not mounted on the liquid crystal panel 100 as shown in FIG. 21, an IC 1324 containing the addressing circuit 1004 and display information processing circuit 1002 is put into physical and electrical contact with a TCP (Tape Carrier Package) 1320 packaged on a polyimide tape 1322 via an anisotropic conductive film provided at the periphery of the TFT array substrate 10, which can be produced, sold and used as a liquid crystal device.

Examples of the electronic appliances shown in FIG. 18 include, other than the electronic appliances described with reference to FIG. 19 through FIG. 21, a liquid crystal television, a viewfinder type or a monitor direct vision type video tape recorder, a car navigator, an electronic notebook, an electronic calculator, a word processor, an engineering work station (EWS), a portable phone, a television phone, a POS terminal and devices provided with a touch panel.

As hitherto described, the present embodiment provides a liquid crystal panel that does not result in decrease of production yield and pixel aperture ratio even when the pixels are made fine, and various electronic appliances provided with the same, by using a relatively simple structure.

The liquid crystal panel according to the present invention allows the surface of the interlayer insulation film to be flat because a lift-up film is formed under the contact hole for providing an opening on the interlayer insulation film in order to put the drain region of the TFT as a switching element into electrical contact with the pixel electrode, thereby reducing the step height on the area where contact holes are to be formed. This constitution enables disclination of the liquid crystal to be prevented along with suppressing the size of the opening of the contact hole from being enlarged when the resist is exposed in the photolithographic process.

What is claimed is:

1. An electrooptical panel comprising:
    a plurality of data lines;
    a plurality of scanning lines crossing at least one of the data lines;
    thin film transistors that electrically contact each data line, each thin film transistor comprising a semiconductor layer and a gate insulation film separating the semiconductor layer from a gate electrode;
    a plurality of pixel electrodes disposed in a matrix and that electrically contact a corresponding thin film transistor;
    at least one interlayer insulation film formed over the semiconductor layer and the gate electrode of each thin film transistor;
    contact holes formed in the at least one interlayer insulation film to allow electrical contact between each pixel electrode and a drain region of a corresponding thin film transistor; and
    a lift-up film formed under at least one contact hole, wherein the lift-up film is disposed below a connecting portion of the pixel electrodes and the drain region of the thin film transistor, protruding from the semiconductor layer below the scanning lines.

2. The electrooptical panel according to claim 1, wherein at least one of the scanning lines and the data lines, and the lift-up film have approximately a same thickness.

3. The electrooptical panel according to claim 1, wherein the lift-up film has approximately a same thickness as at least one of the scanning lines and capacitor lines.

4. The electrooptical panel according to claim 1, wherein the lift-up film is a conductive film in electrical contact with the drain region.

5. The electrooptical panel according to claim 4, wherein the lift-up film is a conductive film simultaneously formed on the drain region using the same material as used in the data lines.

6. The electrooptical panel according to claim 4, wherein the lift-up film is a conductive film formed under the drain region.

7. An electrooptical panel comprising:
    a plurality of data lines;
    a plurality of scanning lines crossing at least one of the data lines;
    thin film transistors that each electrically contact a corresponding data line, each thin film transistor having a semiconductor layer separated from a gate electrode by a gate insulation film;
    a plurality of pixel electrodes disposed in a matrix and that electrically contact a corresponding thin film transistor;
    at least one interlayer insulation film formed on the semiconductor layer and gate electrode of each thin film transistor;
    contact holes formed in the at least one interlayer insulation film to allow electrical contact between each pixel electrode and a drain region of a corresponding thin film transistor;
    a lift-up film formed under at least one contact hole; and
    a capacitor line that serves as one electrode of a capacitor, the capacitor line adjoining the scanning lines and aligned approximately in parallel with the scanning lines,
    wherein the contact holes are disposed between corresponding scanning lines and capacitor lines.

8. The electrooptical panel according to claim 7, wherein the scanning lines and capacitor lines are simultaneously formed using a first material, the gate insulation film and a dielectric film of the capacitor are simultaneously formed using a second material, and the semiconductor layer and the other electrode of the capacitor are simultaneously formed using a third material.

9. The electrooptical panel according to claim 7, wherein at least a part of the lift-up film is formed so as to surround the contact hole, at least one of the scanning lines and capacitor lines defining a hollow portion along the lift-up film.

10. The electrooptical panel according to claim 7, wherein the lift-up film is formed so that the film does not overlap the scanning lines and capacitor lines.

11. The electrooptical panel according to claim 7, wherein the lift-up film has approximately a same thickness as at least one of the scanning lines and capacitor lines.

12. The electrooptical panel according to claim 7, wherein the lift-up film is a conductive film in electrical contact with the drain region.

13. The electrooptical panel according to claim 12, wherein the lift-up film is a conductive film simultaneously formed on the drain region using the same material as used in the data lines.

14. The electrooptical panel according to claim 12, wherein the lift-up film is a conductive film formed under the drain region.

15. An electronic appliance provided with the electrooptical panel according to claim 1.

16. An electronic appliance provided with the electrooptical panel according to claim 7.

17. An electrooptical panel comprising:

a substrate;

a plurality of data lines;

a plurality of scanning lines crossing with the plurality of data lines;

a switching element connected to each data line and scanning line; and a plurality of pixel electrodes disposed in a matrix while being connected to the plurality of switching elements on the substrate;

each pixel electrode being connected to a switching element via a contact hole, wherein the contact hole being allowed to open at a center position between the data line for supplying image signals to the pixel electrode and the data line adjoining said data line.

18. The electrooptical panel according to claim 17, in which capacitor lines for endowing the pixel electrodes with a prescribed capacitance are provided on the substrate in parallel relation to the scanning lines, wherein the contact hole is allowed to open between the capacitor line and scanning line in adjoining relation with each other.

19. The electrooptical panel according to claim 17, wherein at least a lift-up film is provided under the switching element and under the contact hole.

20. The electrooptical panel according to claim 17, wherein the switching element comprises a thin film transistor, the source region of the thin film transistor being in electrical continuity with the data line, the drain region of the thin film transistor being connected to the pixel electrode, and the lift-up film as a conductive film being in electrical continuity with the drain region.

21. The electrooptical panel according to claim 20, wherein the lift-up film is provided so that the film is not overlapped with the scanning line and a capacitor line.

22. The electrooptical panel according to claim 20, wherein the film thickness of the lift-up film is nearly equal to the film thickness of the scanning line and a capacitor line.

23. The electrooptical panel according to claim 17, wherein an opening region for at least one pixel has a plane configuration being in a line symmetry relation to the contact hole.

24. The electrooptical panel according to claim 17, wherein a micro-lens is provided at a position confronting each pixel electrode so that a center of the lens is situated at a center point of an opening region of the pixel.

25. An electronic appliance provided with the electrooptical panel according to claim 17.

26. An electrooptical device comprising:

a first non-pixel opening region having a plurality of data lines disposed in a predetermined interval;

a second non-pixel opening region having a plurality of scanning lines crossing the first non-pixel opening region;

pixel electrodes formed in a pixel opening region;

a switching element connected to each data line and scanning line, the switching element having gate electrodes disposed on a semiconductor layer via an insulation film;

an interlayer insulation film disposed on the semiconductor layer and the gate electrodes;

contact holes formed on the interlayer insulation film and electrically connecting the pixel electrodes and a drain region of the switching element; and a lift-up film formed below the connection portion of the pixel electrodes and the drain region of the switching element and protruding from the semiconductor layer below the gate electrodes.

27. An electrooptical device comprising:

a first non-pixel opening region having a plurality of data lines disposed in a predetermined interval;

a second non-pixel opening region having a plurality of scanning lines crossing the first non-pixel opening region;

a switching element connected to each data line and scanning line;

pixel electrodes formed in a pixel opening region; and contact holes for electrically connecting the pixel electrodes and the switching element, wherein the contact holes are disposed at a center position in the second non-pixel opening region between the first non-pixel opening regions adjoining each other.

\* \* \* \* \*